United States Patent
Tomiyasu et al.

(10) Patent No.: US 10,579,246 B2
(45) Date of Patent: Mar. 3, 2020

(54) INFORMATION DEVICE AND COMPUTER-READABLE STORAGE MEDIUM FOR COMPUTER PROGRAM

(71) Applicants: Kazuhiro Tomiyasu, Toyokawa (JP); Yoichi Kurumasa, Toyokawa (JP); Kenichi Komaba, Toyokawa (JP); Masao Hosono, Toyokawa (JP); Takuya Okada, Shizuoka (JP)

(72) Inventors: Kazuhiro Tomiyasu, Toyokawa (JP); Yoichi Kurumasa, Toyokawa (JP); Kenichi Komaba, Toyokawa (JP); Masao Hosono, Toyokawa (JP); Takuya Okada, Shizuoka (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 13/837,924

(22) Filed: Mar. 15, 2013

(65) Prior Publication Data
US 2013/0246973 A1 Sep. 19, 2013

(30) Foreign Application Priority Data
Mar. 15, 2012 (JP) .................. 2012-058791

(51) Int. Cl.
*G06F 3/048* (2013.01)
*G06F 3/0485* (2013.01)
(Continued)

(52) U.S. Cl.
CPC .......... *G06F 3/0485* (2013.01); *G06F 3/0488* (2013.01); *H04N 1/00411* (2013.01);
(Continued)

(58) Field of Classification Search
CPC ...... G06F 3/016; G06F 3/0416; G06F 3/0485; G06F 3/0484; G06F 17/2247; G06F 17/30873; G06F 2203/04808
(Continued)

(56) References Cited

U.S. PATENT DOCUMENTS

| 5,510,808 A | 4/1996 | Cina, Jr. et al. |
| 5,872,566 A * | 2/1999 | Bates ................... G06F 3/04855 |
| | | 715/786 |

(Continued)

FOREIGN PATENT DOCUMENTS

| JP | 04-232526 A | 8/1992 |
| JP | 08-096295 A | 4/1996 |

(Continued)

OTHER PUBLICATIONS

Office Action (Notification of Reason(s) for Refusal) dated Aug. 12, 2014, by the Japanese Patent Office in corresponding Japanese Patent Application No. 2012-058791, and an English translation of the Office Action. (7 pages).

(Continued)

*Primary Examiner* — Nicholas Augustine
(74) *Attorney, Agent, or Firm* — Buchanan Ingersoll & Rooney PC

(57) ABSTRACT

An information device having a touch-sensitive panel for displaying an operating screen having a scrolled display region is provided. The information device includes sets of data classified into at least three groups arranged in accordance with a predetermined order; a list display control portion for displaying, in the scrolled display region, a data list in which the sets of data classified into any one of the groups are listed; a scroll control portion for, when the data list is displayed, scrolling through the data list in accordance with touch operation of touching a position in the scrolled (Continued)

display region; and a support display control portion for displaying, in accordance with the touch operation, as pop-up, icons in a manner to appear in the predetermined order on the operating screen along one direction. The icons function as indicators corresponding to groups that are a part of the three groups.

34 Claims, 25 Drawing Sheets

(51) Int. Cl.
　　*G06F 3/0488* (2013.01)
　　*H04N 1/00* (2006.01)
　　*G06F 3/01* (2006.01)
(52) U.S. Cl.
　　CPC ..... *H04N 1/00413* (2013.01); *H04N 1/00472* (2013.01); *H04N 1/00474* (2013.01); *H04N 1/00482* (2013.01); *H04N 2201/0094* (2013.01)
(58) Field of Classification Search
　　USPC .................................................. 715/757, 830
　　See application file for complete search history.

(56) References Cited

U.S. PATENT DOCUMENTS

| | | | |
|---|---|---|---|
| 5,941,930 A | 8/1999 | Morimoto et al. | |
| 7,245,293 B2 | 7/2007 | Hoshino et al. | |
| 7,770,120 B2* | 8/2010 | Baudisch | G06F 3/0486 |
| | | | 715/740 |
| 8,381,122 B2* | 2/2013 | Louch | G06F 3/0481 |
| | | | 715/784 |
| 8,432,396 B2* | 4/2013 | Paquette | G06F 3/0483 |
| | | | 345/427 |
| 8,473,859 B2* | 6/2013 | Chaudhri | G06F 3/048 |
| | | | 715/782 |
| 8,479,110 B2* | 7/2013 | Johnson | G06F 3/0481 |
| | | | 715/702 |
| 8,769,403 B2* | 7/2014 | Tsuda | G06F 3/048 |
| | | | 715/252 |
| 2003/0064757 A1* | 4/2003 | Yamadera | G06F 3/0482 |
| | | | 455/566 |
| 2005/0182766 A1 | 8/2005 | Feinberg et al. | |
| 2005/0210403 A1 | 9/2005 | Satanek | |
| 2008/0062141 A1* | 3/2008 | Chandhri | G06F 3/0482 |
| | | | 345/173 |
| 2009/0021475 A1* | 1/2009 | Steinle | G06F 19/3406 |
| | | | 345/156 |
| 2009/0237372 A1* | 9/2009 | Kim | G06F 3/044 |
| | | | 345/173 |
| 2010/0077343 A1* | 3/2010 | Uhl | G06F 3/04855 |
| | | | 715/787 |
| 2010/0251165 A1 | 9/2010 | Williams | |
| 2010/0257486 A1 | 10/2010 | Smith | |
| 2012/0042279 A1 | 2/2012 | Naderi | |
| 2012/0240044 A1* | 9/2012 | Johnson | G06F 3/0481 |
| | | | 715/716 |

FOREIGN PATENT DOCUMENTS

| | | |
|---|---|---|
| JP | 2004-070492 | 3/2004 |
| JP | 2005-244360 | 9/2005 |
| JP | 2009-521754 A | 6/2009 |
| JP | 2009-295173 A | 12/2009 |
| WO | 00/36496 A1 | 6/2000 |
| WO | 2007/076226 A1 | 7/2007 |

OTHER PUBLICATIONS

Office Action (Notification of Reason(s) for Refusal) dated Jan. 28, 2014, by the Japan Patent Office in corresponding Japanese Patent Application No. 2010-058791, and an English Translation of the Office Action. (5 pages).

* cited by examiner

FIG. 7   250

| COMMUNICATION TYPE | INDEX | DESTINATION DATA | SERIAL NUMBER |
|---|---|---|---|
| | \multicolumn{3}{c}{DESTINATION DATABASE} |
| FAX (401) | A (501) | ⋮ | ⋮ |
| | B (502) | ⋮ | ⋮ |
| | C (503) | ⋮ | ⋮ |
| | ⋮ | ⋮ | ⋮ |
| | Y (525) | ⋮ | ⋮ |
| | Z (526) | ⋮ | ⋮ |
| I-FAX (402) | A | ⋮ | ⋮ |
| | ⋮ | ⋮ | ⋮ |
| | Z | ⋮ | ⋮ |
| E-mail (403) | A | ⋮ | ⋮ |
| | ⋮ | ⋮ | ⋮ |
| | Z | ⋮ | ⋮ |
| FTP (404) | A | ⋮ | ⋮ |
| | ⋮ | ⋮ | ⋮ |
| | Z | ⋮ | ⋮ |
| SMB (405) | A | ⋮ | ⋮ |
| | ⋮ | ⋮ | ⋮ |
| | Z | ⋮ | ⋮ |
| WebDAV (406) | A | ⋮ | ⋮ |
| | ⋮ | ⋮ | ⋮ |
| | Z | ⋮ | ⋮ |
| SIP-FAX (407) | A | ⋮ | ⋮ |
| | ⋮ | ⋮ | ⋮ |
| | Z | ⋮ | ⋮ |
| IP-AD-FAX (408) | A | ⋮ | ⋮ |
| | ⋮ | ⋮ | ⋮ |
| | Z | ⋮ | ⋮ |

| INDEX OF DATA CURRENTLY DISPLAYED | SUPPORT DISPLAY PATTERN |
|---|---|
| A |     A M Z |
| B |   A B N Z |
| C | A B C N Z |
| D | A B D O Z |
| E | A C E O Z |
| F | A C F P Z |
| G | A D G P Z |
| H | A D H Q Z |
| I | A E I Q Z |
| J | A E J R Z |
| K | A F K R Z |
| L | A F L S Z |
| M | A G M S Z |
| N | A G N T Z |
| O | A H O T Z |
| P | A H P U Z |
| Q | A I Q U Z |
| R | A I R V Z |
| S | A J S V Z |
| T | A J T W Z |
| U | A K U W Z |
| V | A K V X Z |
| W | A L W X Z |
| X | A L X Y Z |
| Y | A M Y Z |
| Z | A M Z |

| DOCUMENT DATABASE | | | |
|---|---|---|---|
| BOX NAME | INDEX | DOCUMENT NAME | SERIAL NUMBER |
| SHARED BOX | 2011.12 | ⋮ | ⋮ |
| | ⋮ | ⋮ | ⋮ |
| | 2011.01 | ⋮ | ⋮ |
| | 2010.12 | ⋮ | |
| | ⋮ | ⋮ | |
| | 2009.01 | ⋮ | ⋮ |
| PERSONAL BOX 1 | 2011.12 | ⋮ | ⋮ |
| | ⋮ | ⋮ | |
| | 2009.01 | ⋮ | ⋮ |
| PERSONAL BOX 2 | 2011.12 | ⋮ | ⋮ |
| | ⋮ | ⋮ | |
| | 2009.01 | ⋮ | ⋮ |
| ⋮ | ⋮ | ⋮ | ⋮ |
| PERSONAL BOX 29 | 2011.12 | ⋮ | ⋮ |
| | ⋮ | ⋮ | |
| | 2009.01 | ⋮ | ⋮ |
| PERSONAL BOX 30 | 2011.12 | ⋮ | ⋮ |
| | ⋮ | ⋮ | |
| | 2009.01 | ⋮ | ⋮ |

701 → 2011.12
712 → 2011.01
601 → SHARED BOX
713 → 2010.12
736 → 2009.01
602 → PERSONAL BOX 1
603 → PERSONAL BOX 2
630 → PERSONAL BOX 29
631 → PERSONAL BOX 30

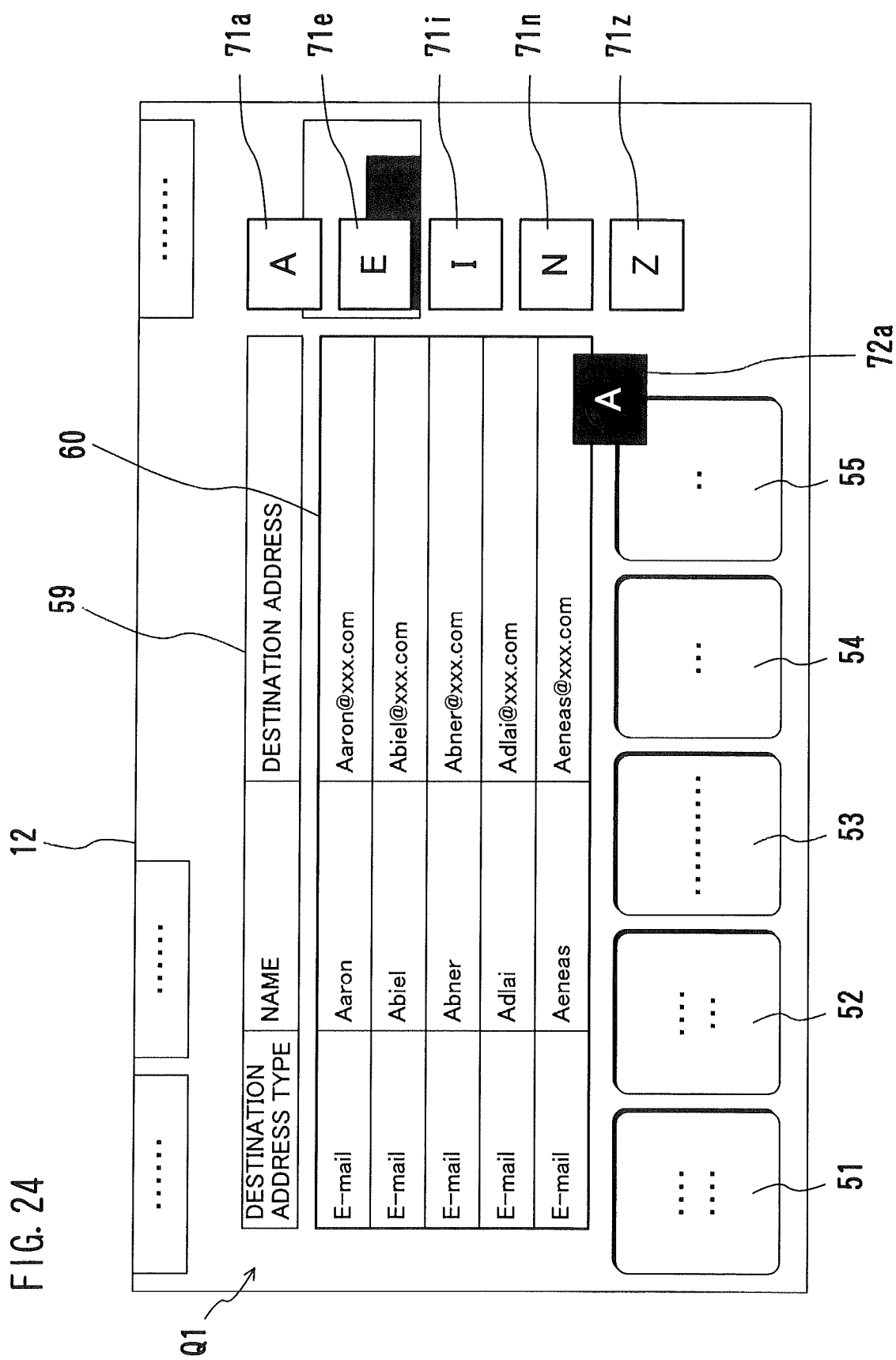

INFORMATION DEVICE AND COMPUTER-READABLE STORAGE MEDIUM FOR COMPUTER PROGRAM

This application is based on Japanese patent application No. 2012-058791 filed on Mar. 15, 2012, the contents of which are hereby incorporated by reference.

BACKGROUND OF THE INVENTION

1. Field of the Invention

The present invention relates to an information device provided with a touch-sensitive panel and a computer-readable storage medium for computer program executed in such an information device. An example of the information device is a Multi-functional peripheral (MFP) having a print function and various information processing functions.

2. Description of the Related Art

Touch-sensitive panels are widely used as means through which manipulations are performed on information devices. A touch-sensitive panel herein is an input/output device in which a display capable of displaying screens and a touch-sensitive pointing device are combined with each other. The pointing device transparent to light is brought into intimate contact with the front face of the display. The surface of the touch-sensitive panel functions as both a screen and a touch input screen. In the touch-sensitive panel, what is displayed on the screen changes appropriately in accordance with manipulations by a user.

Concerning manipulations on an information device via a touch-sensitive panel, a Graphical User Interface (GUI) is known. According to the GUI, an operating screen (image for operation) having a size larger than that of a display is scrolled so that the whole image can be viewed. There is proposed a digital multifunctional device having an operational display panel (Japanese Laid-open Patent Publication No. 2005-244360). In the operational display panel, slider bars extending in the horizontal and vertical directions respectively are provided outside a display of a touch-sensitive panel. When a part of an address list for facsimile or data transmission is displayed on the display, a user of the digital multifunctional device moves sliders in the slider bars to scroll up, down, or across the address list. The positions of the sliders in the slider bars indicate a relative position of the displayed part of the entire address list.

Meanwhile, recent mobile information devices such as a tablet personal computer or smartphone are configured to receive, as scrolling, "drag" gestures and "flick" gestures by one finger or pen. The "drag" gesture means touching a spot, with the finger or pen, on a touch input screen to drag the finger or pen thereon. The "flick" gesture means touching a spot, with the finger or pen, on the touch input screen to move the finger or the pen in a quick flicking motion. In the drag gesture, the screen is generally scrolled at a speed substantially the same as that of the movement of the finger or pen, and the screen is generally scrolled by a distance substantially the same as that of the movement of the finger or pen. In the flick gesture, the screen is generally scrolled by a distance longer than a distance the finger or pen moves on the touch input screen, and the screen is generally scrolled in a larger degree as the finger or pen moves quicker on the touch input screen.

As for the drag gesture, there is proposed a technology for changing a color and a size of a draggable icon depending on manipulations. According to a display disclosed in Japanese Laid-open Patent Publication No. 2004-070492, when a user touches a draggable icon on a screen with his/her fingertip, a color of the icon is changed to notify the user that the icon is draggable. Then, when the user performs operation for pushing the icon, the display changes the size and color of the icon to notify the user that the icon is ready to be dragged.

The flick gesture and the drag gesture are useful to scroll a display made on the screen. The entirety of the scroll screen functions as a button for scrolling. This eliminates the need for the user to look for a button designed specifically for scrolling. This also enables the user to freely scroll a display on the screen in one direction or a direction opposite thereto while watching the screen.

The user sometimes repeats a quick flick gesture in one direction in order to scroll the screen little by little. The user sometimes alternates between scrolling in one direction and scrolling in the opposite direction. Here is an example of displaying an address book indicating addressees and telephone numbers corresponding thereto. In such a case, in spite of the fact that the addressees and the telephone numbers are listed in sorted order by addresses (for example, in alphabetical order by the first letter of the addressee), the user sometimes scrolls through the address book repeatedly. A reason why such operation is repeatedly performed is as follows: When the user scrolls the screen one time and the screen stops being scrolled, he/she subsequently scrolls the screen again without being aware of which part of the entire image the displayed non-scrolled image corresponds to.

SUMMARY

The present disclosure is directed to solve the problems pointed out above, and therefore, an object of an embodiment of the present invention is to provide a technology for enabling, on a screen limited in size, a user to know to which positional part of the entire scrolled image a part of the image displayed corresponds, and to provide a higher degree of flexibility in scrolling.

A device according to one aspect of the present invention is an information device provided with a touch-sensitive panel for displaying an operating screen having a scrolled display region. The information device includes a data storage portion configured to store therein a plurality of sets of data classified into at least three groups arranged in accordance with a predetermined order; a list display control portion configured to display, in the scrolled display region, a data list in which the plurality of sets of data classified into any one of the groups are listed; a scroll control portion configured to, when the data list is displayed, scroll through the data list in accordance with touch operation, the touch operation being to touch a position in the scrolled display region in a touch input screen of the touch-sensitive panel and to move the position touched in one direction; and a support display control portion configured to display, in accordance with the touch operation, as pop-up, a plurality of icons in a manner to appear in the predetermined order on the operating screen along one direction, the plurality of icons functioning as indicators corresponding to groups that are a part of said at least three groups and include a group corresponding to data displayed in the scrolled display region.

These and other characteristics and objects of the present invention will become more apparent by the following descriptions of preferred embodiments with reference to drawings.

BRIEF DESCRIPTION OF THE DRAWINGS

FIG. 7 is a diagram showing an example of the structure of data in a destination database related to scrolled display.

FIG. 10 is a diagram showing an example of a display pattern table for displaying icons in post-thinning indices display format.

FIG. 23 is a diagram showing an example of the structure of data in a document database related to scrolled display.

FIG. 24 is a diagram showing a variation of display control format in a scrolled display region.

DESCRIPTION OF THE PREFERRED EMBODIMENTS

Figure 1A:
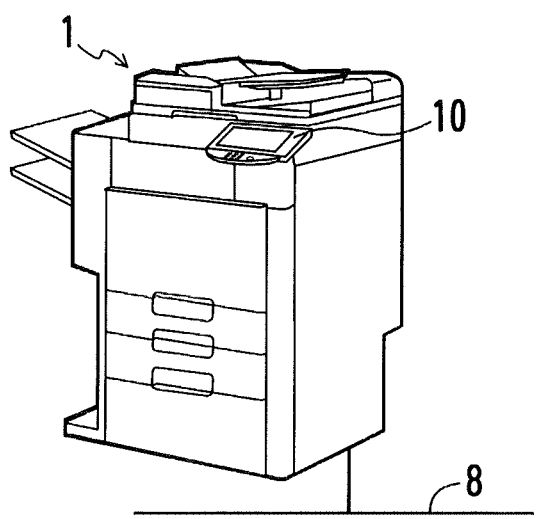
FIG. 1A is an external view showing an example of the entire structure of an image forming apparatus functioning as an information device.

Descriptions are provided below by taking an image forming apparatus designed for business use as an example of an information device providing a scrolled display. An image forming apparatus 1 shown in FIG. 1A is a Multi-functional peripheral (MFP) used for copying, network printing, etc. The image forming apparatus 1 is connected to a Local Area Network (LAN) 8 installed on an office of business and the like, so that the image forming apparatus 1 performs data communication with information processing apparatuses such as personal computers or servers, and facsimile communication with external communication devices. The image forming apparatus 1 operates in response to accesses from the external devices or manipulations through an operating panel 10 provided on the front of the upper part of a casing of the image forming apparatus 1.

Figure 1B:
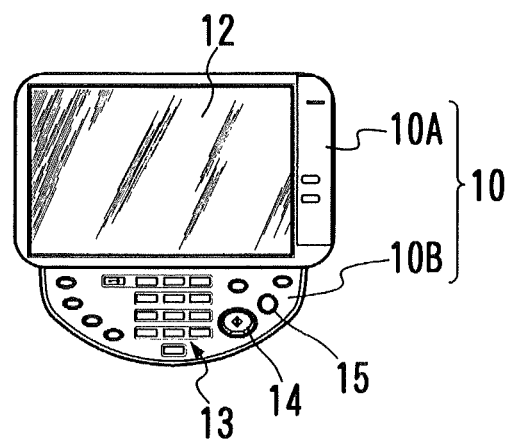
FIG. 1B is a diagram showing an example of the structure of an operating panel.

As shown in FIG. 1B, the operating panel 10 is configured of a touch-sensitive panel portion 10A capable of displaying any operating screen and a keypad portion 10B having fixed-keys. A touch-sensitive panel 12 placed on the touch-sensitive panel portion 10A is provided with a display for displaying operating screens, and a touch-sensitive input device that is transparent to light and is provided to make intimate contact with the face of the display. The fixed-keys of the keypad portion 10B are, for example, a group of numeric input keys (numeric keypad) 13, a start key 14 for starting job execution, and a stop key 15 for halting job execution.

Figure 2:
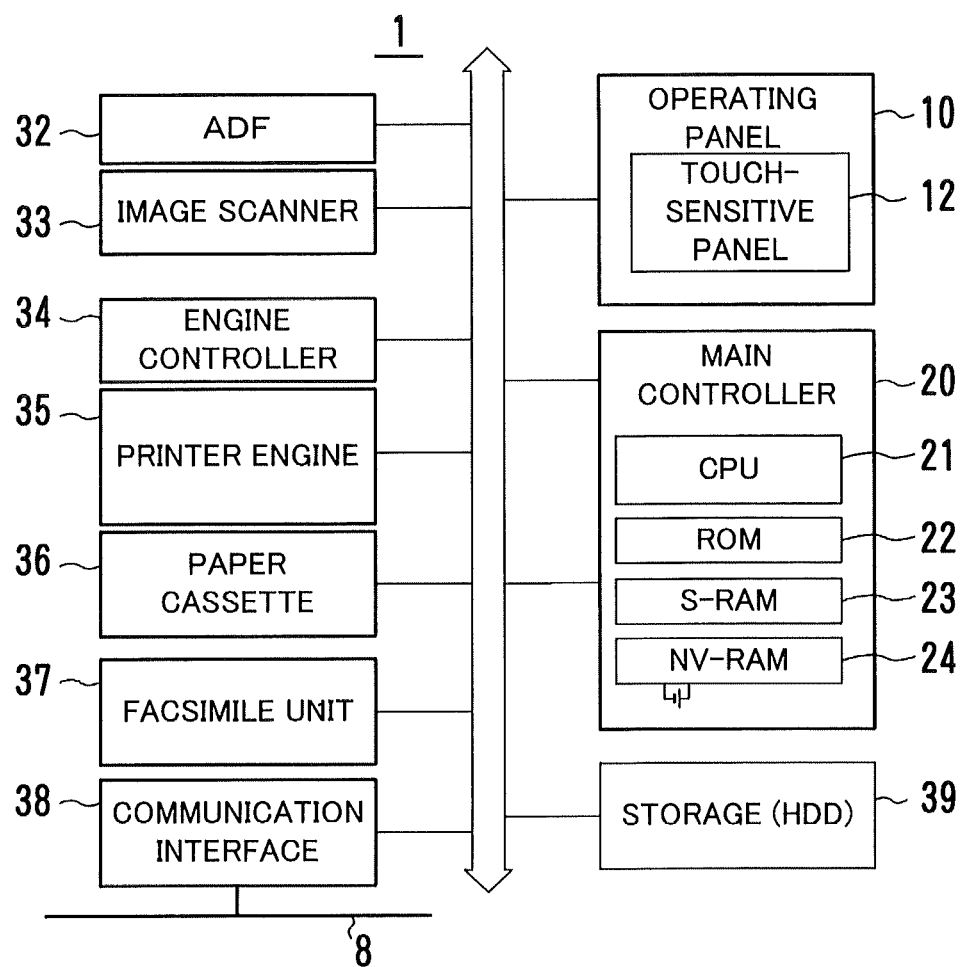
FIG. 2 is a block diagram showing an example of the hardware configuration of an image forming apparatus.

As shown in FIG. 2, the image forming apparatus 1 has a main controller 20 for controlling an overall operation of the image forming apparatus 1. The main controller 20 has a Central Processing Unit (CPU) 21 functioning as a computer for executing a control program and a variety of applications, a Read Only Memory (ROM) 22 for storing the control program therein, a Static Random Access Memory (S-RAM) 23 used as a work area for program execution, a battery-backup Non-volatile RAM (NV-RAM) 24 for storing preset values for operation, and so on.

An automatic document feeder (ADF) 32 is provided with a document tray. In the case of copying, image input, or facsimile transmission, the ADF 32 feeds a document sheet placed on the document tray to a scan position of an image scanner 33. The image scanner 33 serves to optically read out image information recorded on the document sheet. An engine controller 34 is operable to control operation of a printer engine 35. The printer engine 35 is operable to print, through electrophotography, a monochrome or color image onto a single side or both sides of paper supplied from a multi-stage paper cassette 36. A facsimile unit 37 performs data processing for facsimile transmission/reception using the LAN 8 or a non-illustrated telephone line. A communication interface 38 connects the image forming apparatus 1 to the LAN 8. A storage 39 is a mass storage device such as a hard disk drive (HDD). The storage 39 has a memory area in which the control program and control data including screen data for display of operating screens are saved, and also has a memory area (so-called box) in which a variety of document files are saved. The data and programs stored in the storage 39 are loaded into the work area if required.

The image forming apparatus 1 having the foregoing configuration is provided with a GUI to provide a scrolled display on the operating panel 10. The configuration and operation of the image forming apparatus 1 related to such a scrolled display are described below.

Figure 3:
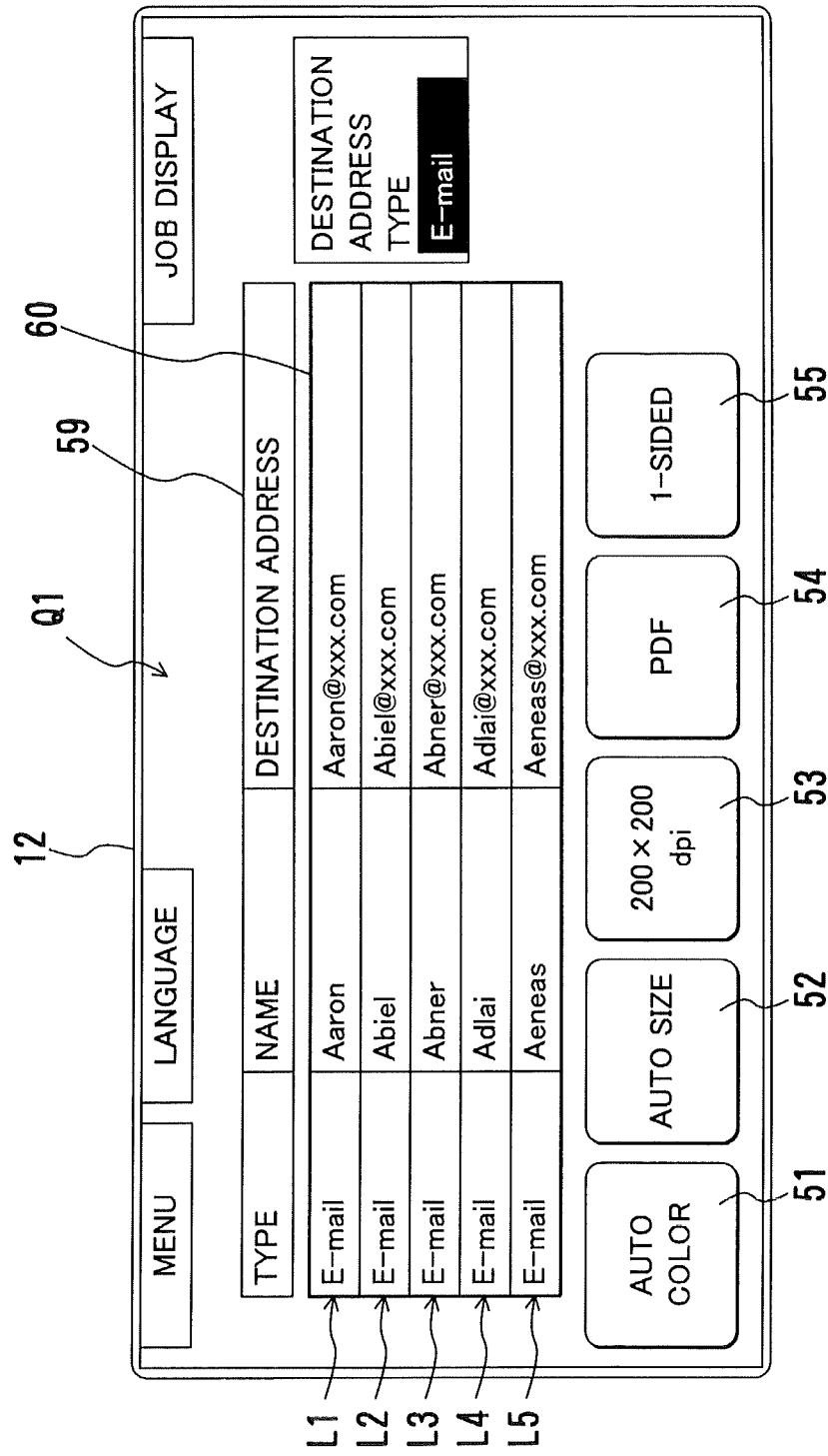
FIG. 3 is a diagram showing an example of an operating screen having a scrolled display region.

FIG. 3 shows an operating screen Q1 displayed on the entire face of the touch-sensitive panel 12. The operating screen Q1 is a screen for a user to make settings for operation of reading out a document image with the image scanner 33 to send data on the document image to an external device. The operating screen Q1 has a scrolled display region 60 in which an address list is displayed. The address list in the scrolled display region 60 is scrolled up and down along the vertical direction of the drawing. The operating screen Q1 has a band-like region 59 above the scrolled display region 60. The band-like region 59 shows display items of the address list scrolled up and down. In the illustrated example, the display items are "type", "name (addressee)", and "destination address". Records indicating destination data for electronic mail are filled in five lines L1, L2, L3, L4, and L5 in the scrolled display region 60. Below the scrolled display region 60, operation buttons 51, 52, 53, 54, and 55 are provided to call up configuration screens corresponding to document scan setting items of color, size, resolution, file format, and print side.

While the address list is static on the display, a user performs tap operation of touching any position in the scrolled display region 60 on the screen and quickly releasing therefrom. In response to the tap operation, a destination address in a line corresponding to the touched position in the address list is selected as a transmission destination. Then, when the user taps again the line corresponding to the selected transmission destination, the selection is cancelled. Scrolling by the user scrolls the address list displayed in the scrolled display region 60.

Figure 4:
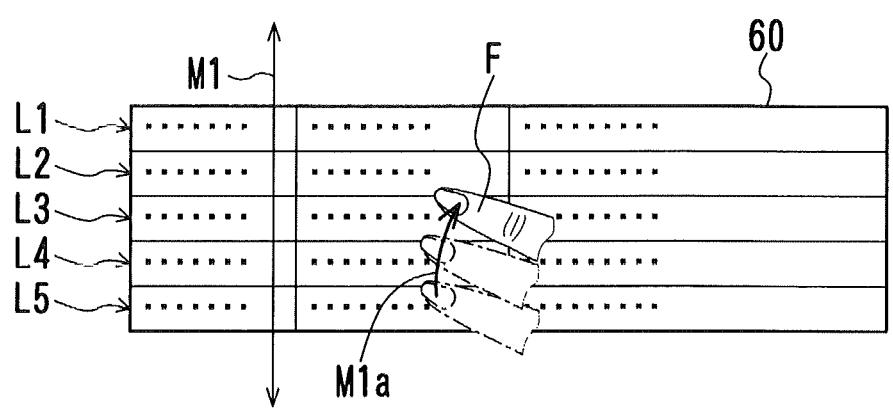
FIG. 4 is a diagram showing an example of scrolling.

As shown in FIG. 4, the scrolling is an action to touch, with a finger F, any position in the scrolled display region 60 to move the finger F in the direction of the arrow M1a which is along the scroll direction M1. As far as the touched position is included in the scrolled display region 60, both the flick gesture and the drag gesture correspond to the scrolling in the image forming apparatus 1.

Figure 5:
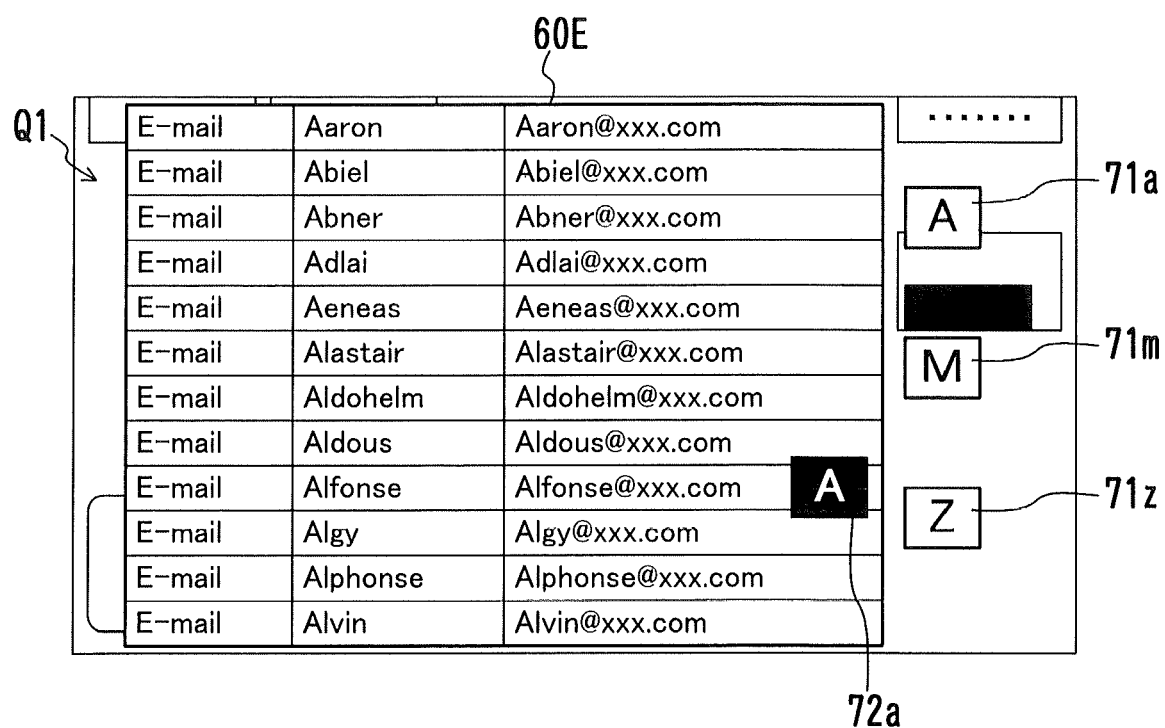
FIG. 5 is a diagram showing an example as to how icons are displayed for scrolling.

In response to the scrolling, as shown in FIG. 5, the operating screen Q1 displays, instead of the scrolled display region 60, a scrolled display region 60E which is vertically longer than the scrolled display region 60. Stated differently, in response to the scrolling, the scrolled display region 60 is extended along the scroll direction. This increases the number of lines of the address list displayed on the screen, which enables the user to quickly find a desired destination.

Further, in response to the foregoing scrolling, as shown in FIG. 5, the image forming apparatus 1 displays, as pop-up, icons 71a, 71m, and 71z to form a line on the operating screen Q1. In response to the scrolling, the image forming apparatus 1 also displays, as pop-up, one icon 72a having a design different from those of the icons 71a, 71m, and 71z. The icon 72a is displayed adjacent to the icons 71a, 71m, and 71z forming a line. The illustrated icon 72a has colors inverted from the colors of the icon 71a. The icons 71a, 71m, and 71z and the icon 72a pop up in order to assist the user in knowing which part of the address list is currently displayed on the screen.

The icons 71a, 71m, and 71z and the icon 72a represent, among indices (described later) corresponding to the address list, a limited number of indices or less. To be specific, the independent icon 72a represents an index corresponding to the first line of the currently-displayed part of the address list. As with the independent icon 72a, the icon 71a represents an index corresponding to the first line of the currently-displayed part of the address list, and the other icons 71m and 71z represent other indices. The order in which the indices are arrayed is determined in advance (alphabetical order in this example). Therefore, which part of the address list is currently displayed is known from the positional relationship between the icon 71a, which represents the same index as the icon 72a, and the other icons 71m and 71z. The number of icons 71a, 71m, and 71z arranged vertically in the example is limited. Instead, the icons themselves and the characters therein are displayed large for easy viewing. As is clear from the drawing, the indices represented by the icons stand out compared to characters in the address list. Displaying the icons makes it easy for the user to know a state of the scrolled display because such large letters represented in the icons are used, on the screen as visual information on the address list for the user. It is desirable that the icons 71a, 71m, and 71z, and the icon 72a are displayed at positions in a manner to avoid the interference with data displayed in the scrolled display region 60E, and at the same time, to be close to the data as much as possible.

Hereinafter, icons arranged to form a line such as the icons 71a, 71m, and 71z are individually referred to as the icons 71 in some cases, and collectively referred to as the icon 71 in other cases, except for the case where the icons 71a, 71m, and 71z are needed to be distinguished from one another. Further, an icon such as the icon 72a arranged separately from the other icons is sometimes referred to as the icon 72.

Figure 6:
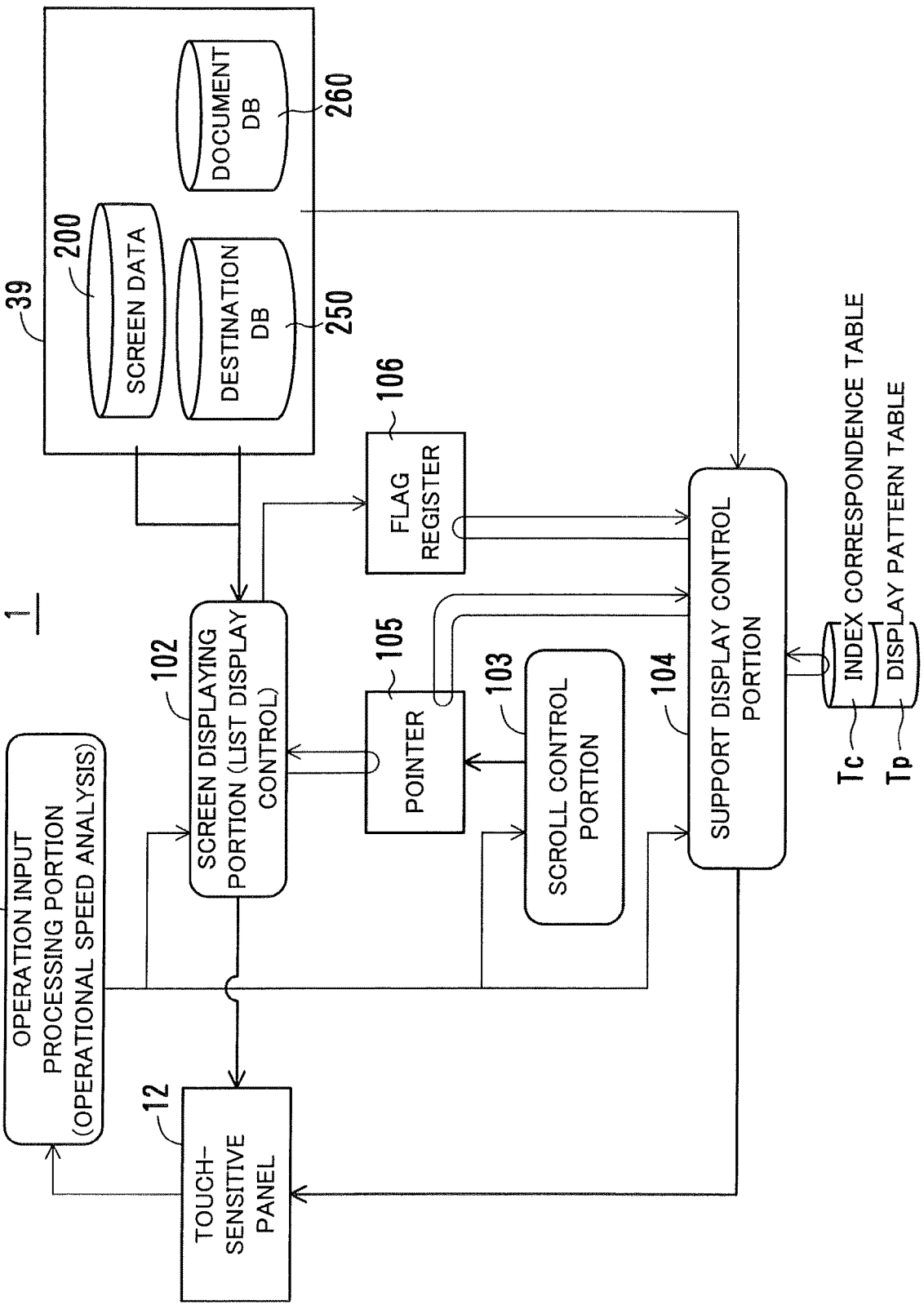
FIG. 6 is a diagram showing an example of the functional configuration related to scrolling in an image forming apparatus.

FIG. 6 is a diagram showing an example of the functional configuration related to scrolling in the image forming apparatus 1. The image forming apparatus 1 is configured of an operation input processing portion 101, a screen displaying portion 102, a scroll control portion 103, a support display control portion 104, and so on. These portions are functional elements implemented at a time when the CPU 21 of the main controller 20 or a CPU incorporated as a panel control computer into the operating panel 10 executes a display control program.

The operation input processing portion 101 analyzes touch operation based on an output from the touch-sensitive panel 12, and conveys user's command to a functional portion that is to activate in accordance with the command. For example, a command to switch between screens is conveyed to the screen displaying portion 102, and a scroll command is conveyed to the scroll control portion 103 and the support display control portion 104. When a flick gesture or a drag gesture is performed, the operation input processing portion 101 checks whether the gesture corresponds to high-speed operation in which a rate of change at the touched position is larger than a threshold or low-speed operation in which the rate of change is lower than the threshold. Stated differently, the operation input processing portion 101 acts as an operational speed analysis portion.

The screen displaying portion 102 uses the screen data 200 stored in the storage 39 to display an operating screen in the touch-sensitive panel 12 depending on the state of the image forming apparatus 1. The screen displaying portion 102 functions also as a list display control portion for displaying a data list in which a series of data sets are present. For example, in order to display the operating screen Q1, the screen displaying portion 102 reads out necessary data from a destination database 250 stored in the storage 39, and adds an address list to the scrolled display region 60. At this time, a part of the address list to be displayed is indicated by the pointer 105. The pointer 105 indicates, as default, the first line of the display target list. The screen displaying portion 102 displays the list ranging from the line selected by the pointer 105 to a predetermined number-th line in the bottom of the list. How many lines are displayed at one time depends on the size of the scrolled display region 60. The number of lines displayed at one time increases by increasing the size of a region from the scrolled display region 60 to the scrolled display region 60E. Besides the address list, in order to display an operating screen on which a user selects a document to be printed or transmitted, the screen displaying portion 102 adds a document list to a scrolled display region in the operating screen. The document list is formed based on data of a document database 260 stored in the storage 39.

When a data list such as an address list or a document list is displayed and a line of the data list is selected through tap operation, the screen displaying portion 102 distinguishes the selected line from non-selected lines by, for example, changing the background color of the selected line. The screen displaying portion 102 also sets a flag indicating an index corresponding to the selected line in a flag register 106.

The screen displaying portion 102 refers to the pointer 105 at predetermined time intervals and updates a display made in the scrolled display region as necessary in such a manner that the line selected at the reference time by the pointer 105 is displayed.

The scroll control portion 103 changes the line currently selected by the pointer 105 to a line on the upper or lower part of the displayed list depending on the direction of scrolling, and controls the screen displaying portion 102 to update the display made on the scrolled display region. Changing a line selected by the pointer 105 by a predetermined amount of change is repeated predetermined number of times depending on the scrolling speed and the dragged distance, so that the data list is scrolled in the scrolled display region.

The support display control portion 104 displays, as pop-up, the icons 71 and 72 on the operating screen having the scrolled display region as described above. The support display control portion 104 locates a displayed part of the scroll target data list (such a part is hereinafter referred to as a "displayed line") with the pointer 105; thereby to determine a plurality of indices to be displayed as the icons 71 and 72.

The support display control portion 104 creates, in advance, an index correspondence table Tc appropriately in order to pinpoint an index that is necessary for support display and corresponds to a displayed line (such an index is hereinafter referred to as a "required index"). The index correspondence table Tc is information in which all indices of the data list are associated with values probably obtained by the pointer 105 (i.e., lines probably selected by the pointer 105). For example, when an address list is used as the data list, data contained in the index correspondence table Tc is extracted from the destination database 250.

After pinpointing the required index, the support display control portion 104 determines a plurality of indices including the required index to be displayed by using a look-up table method of referring to a display pattern table Tp, or, alternatively, by using an operation method of calculating based on ordinal ranks in the index arrangement. The display pattern table Tp is stored in the storage 39 in advance. The display pattern table Tp shows, for all the indices of the data list, data indicating a plurality of indices to be displayed for a case where each of the indices is used as the required index.

After determining the indices to be displayed, the support display control portion 104 refers to the flag register 106 for popping up the icons 71 corresponding to the indices to be displayed. The support display control portion 104 then emphasizes an index to which a flag representing the presence/absence of the selected index is set.

The support display function of the image forming apparatus 1 is detailed below by taking an example of the case where an address list is scrolled.

FIG. 7 is a diagram showing an example of the structure of data in the destination database 250. The destination database 250 has recorded therein destination data for a variety of types of communication available in the image forming apparatus 1. The destination data has items of, at least, an addressee and a destination (telephone number or address). Such sets of destination data are classified into M groups depending on the communication type and also classified into N groups depending on the addressee; thereby to be managed in the destination database 250.

The types of communication available in the image forming apparatus 1 are eight types of "FAX", "I-FAX", "E-mail", "FTP", "SMB", "WebDAV", "SIP-FAX", and "IP-AD-FAX". The type "FAX" is ordinary facsimile communication using a public telephone network. The type "I-FAX" is facsimile communication using the Internet. The type "E-mail" is transmission/reception of electronic mail messages. The type "FTP" is file transmission according to a File Transfer Protocol (FTP). The type "SMB" is data communication according to a Server Message Block (SMB). The type "WebDAV" is data communication according to a Web Distributed Authoring and Versioning (WebDAV). The type "SIP-FAX" is facsimile communication according to a Session Initiation Protocol (SIP). The type "IP-AD-FAX" is facsimile communication within an intranet according to a Simple Mail Transfer Protocol (SMTP). The eight types of communication correspond to eight groups 401, 402, 403, 404, 405, 406, 407, and 408 respectively in FIG. 7. In short, the number M of groups formed by the foregoing classification based on communication types is "eight" in this example.

Destination data of the group 401 also belong to any of 26 groups including groups 501, 502, 503, 525, and 526. The groups 501-526 correspond to 26 letters of indices of addressees from "A" to "Z". To be specific, the group 501 corresponds to destination data for addressees whose names start with "A". The group 526 corresponds to destination data for addressees whose names start with "Z".

As with the group 401, destination data of the groups 402, 403, 404, 405, 406, 407, and 408 belong to any of 26 groups associated with indices. The number N of groups formed by the foregoing classification based on addresses is "26" in this example.

In the destination database 250, the order in which the eight groups 401-408 are arranged is defined as shown in FIG. 7. The order in which the 26 groups corresponding to the indices of addressees are arranged is defined as shown in FIG. 7, i.e., the 26 groups are arranged in alphabetical order. Accordingly, in the case of displaying a list of all sets of the destination data registered in the destination database 250, the scrolled display target is an address list which ranges from the destination data corresponding to the index "A" in the type "FAX" to the destination data corresponding to the index "Z" in the type "IP-AD-FAX" as shown in FIG. 7. Each set of destination data is given a serial number indicating the order of that destination data in the address list. The pointer 105 indicates a line to be displayed in the address list, i.e., destination data, by pointing to a serial number.

Figure 8:
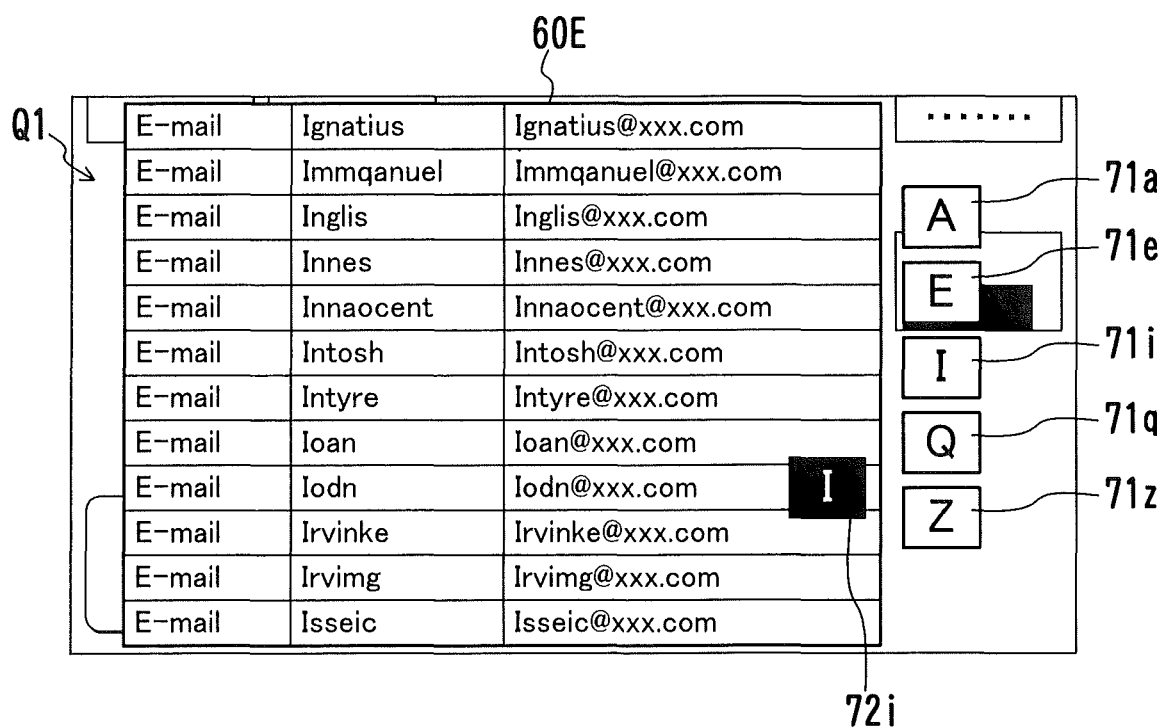
FIG. 8 is a diagram showing an example as to how icons are displayed in post-thinning indices display format.
Figure 9:
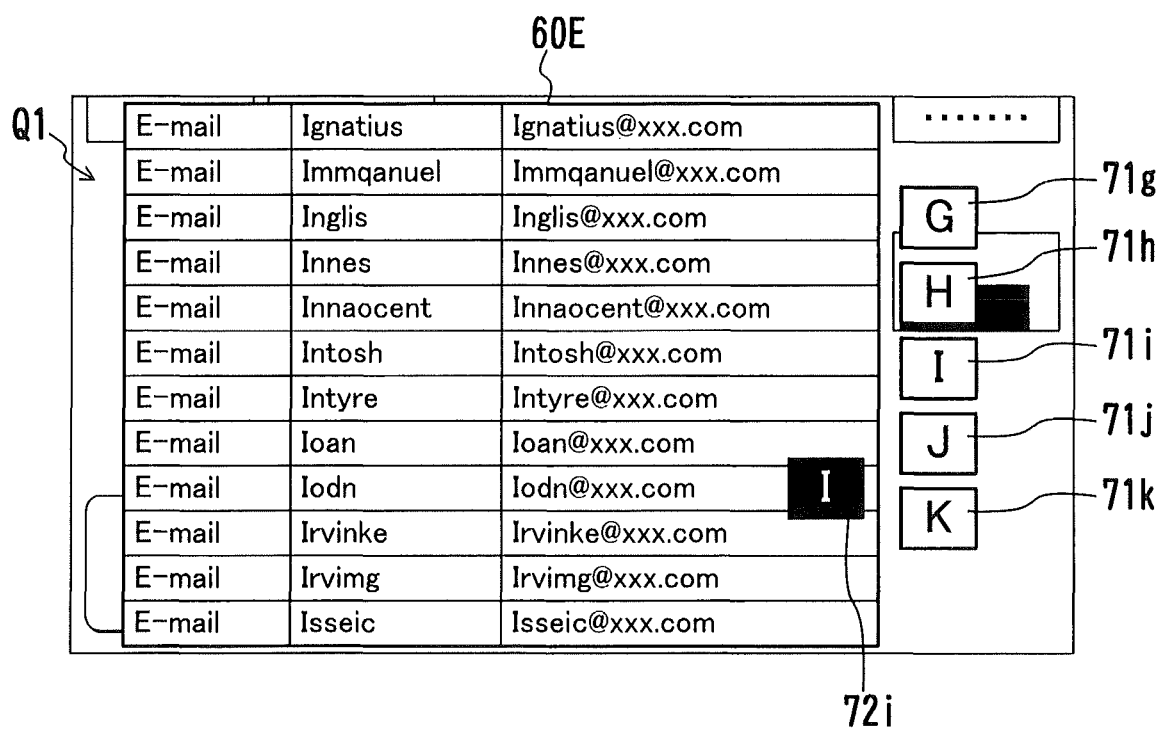
FIG. 9 is a diagram showing an example as to how icons are displayed in adjacent indices display format.

FIG. 8 shows an example as to how icons are displayed in "post-thinning indices display format". FIG. 9 shows an example as to how icons are displayed in "adjacent indices display format". The post-thinning indices display format is format in which, out of the 26 indices from "A" to "Z", at least the top index, a required index, and the bottom index are displayed. The adjacent indices display format is format in which a required index and indices whose ordinal ranks are adjacent to the ordinal rank of the required index are displayed. Note that, in each format, a limited number n (5 in this example) indices or smaller are displayed as the icons 70 arranged to form a line. The limited number n is sufficiently smaller than the number N of indices (26 in this example).

Referring to FIG. 8, an icon 72$i$ shows that a required index, which is an index corresponding to the group currently displayed out of the 26 groups, is "I". On the right of the icon 72$i$, five icons 71$a$, 71$e$, 71$i$, 71$q$, and 71$z$ are arranged vertically for display. The icon 71*i*, which is the middle of the icon arrangement, represents the required index "I". The top icon 71*a* in the icon arrangement represents the index "A" that is the top index (top group) of the address list in alphabetical order. The bottom icon 71*z* in the icon arrangement represents the index "Z" that is the bottom index (bottom group) of the address list in alphabetical order. The icon 71*e* lying between the icon 71*a* and the icon 71*i* represents the index "E" whose ordinal rank in alphabetical order is between the ordinal rank of the index "A" and the ordinal rank of the required index "I". The icon 71*q* lying between the icon 71*i* and the icon 71*z* represents the index "Q" whose ordinal rank in alphabetical order is between the ordinal rank of the required index "I" and the ordinal rank of the index "Z".

Referring to FIG. 9, on the right of the icon 72*i*, five icons 71*g*, 71*h*, 71*i*, 71*j*, and 71*k* are arranged vertically for display. As with the icon arrangement shown in FIG. 8, the icon 71*i* representing the required index "I" lies in the middle of the icon arrangement in FIG. 9. Above the icon 71*i*, there are the icon 71*h* representing the index "H" whose ordinal rank is one higher than that of the required index "I", and the icon 71*g* representing the index "G" whose ordinal rank is one higher than that of the index "H". Below the icon 71*i*, there are the icon 71*j* representing the index "J" whose ordinal rank is one lower than that of the required index "I", and the icon 71*k* representing the index "K" whose ordinal rank is one lower than that of the index "J".

FIG. 10 shows an example of the display pattern table Tp. Referring to the display pattern table Tp, when an index corresponding to destination data currently displayed, i.e., a required index, is "A", predetermined indices to be displayed are three indices of "A", "M", and "Z". When the required index is "B", predetermined indices to be displayed are four indices of "A", "B", "N", and "Z". When the required index is "C", predetermined indices to be displayed are five indices of "A", "B", "C", "N", and "Z". In this way, in the display pattern table Tp, each of the 26 indices is associated with a set of indices to be displayed.

Figure 11:
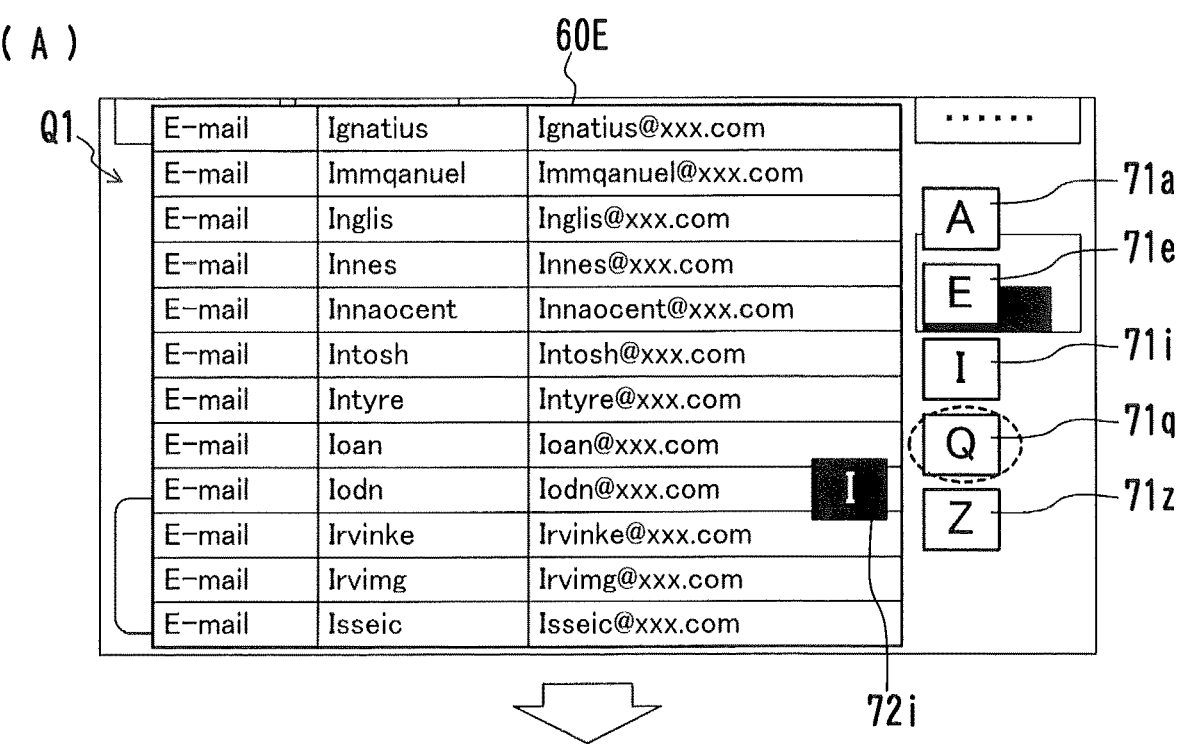
FIG. 11 is a diagram showing an example as to how icons are switched for display in post-thinning indices display format.
Figure 11:
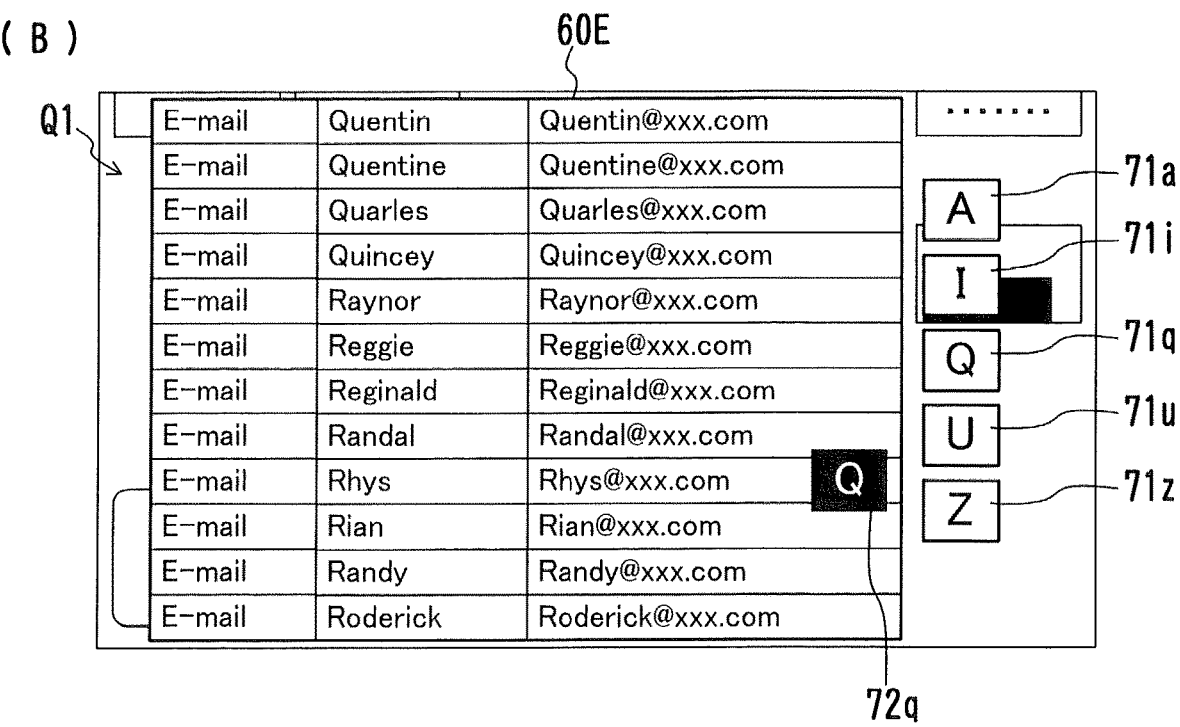

FIG. 11 shows an example as to how icons are switched for display in the post-thinning indices display format. Referring to (A) of FIG. 11, since the initial letter of an addressee for destination data corresponding to the first line in the scrolled display region 60E is "I", the required index is "I". In the illustrated example, the icons 71*a*, 71*e*, 71*i*, 71*q*, and 71*z* representing the indices of "A", "E", "I", "Q", and "Z" respectively are displayed in proximity to the scrolled display region 60E on the operating screen Q1. Suppose that, under this state, the user taps the icon 71 for the index "Q" surrounded by an ellipse indicated by a short dashed line in (A) of FIG. 11. In response to the tap operation, the display made on the operating screen Q1 is changed from the display shown in (A) of FIG. 11 to the display shown in (B) of FIG. 11, instead of being scrolled, in such a manner that data corresponding to the index "I" changes to data corresponding to the index "Q" with data interposed between the index "I" and the index "Q" skipped.

Referring to (B) of FIG. 11, predetermined sets of destination data are displayed in the scrolled display region 60E in such a manner that destination data having the initial letter of "Q" is displayed in the first line. In the illustrated example, the icon 72*q* representing the required index "Q", and the icons 71*a*, 71*i*, 71*q*, 71*u*, and 71*z* representing the indices of "A", "I", "Q", "U", and "Z" respectively are displayed.

Figure 12:
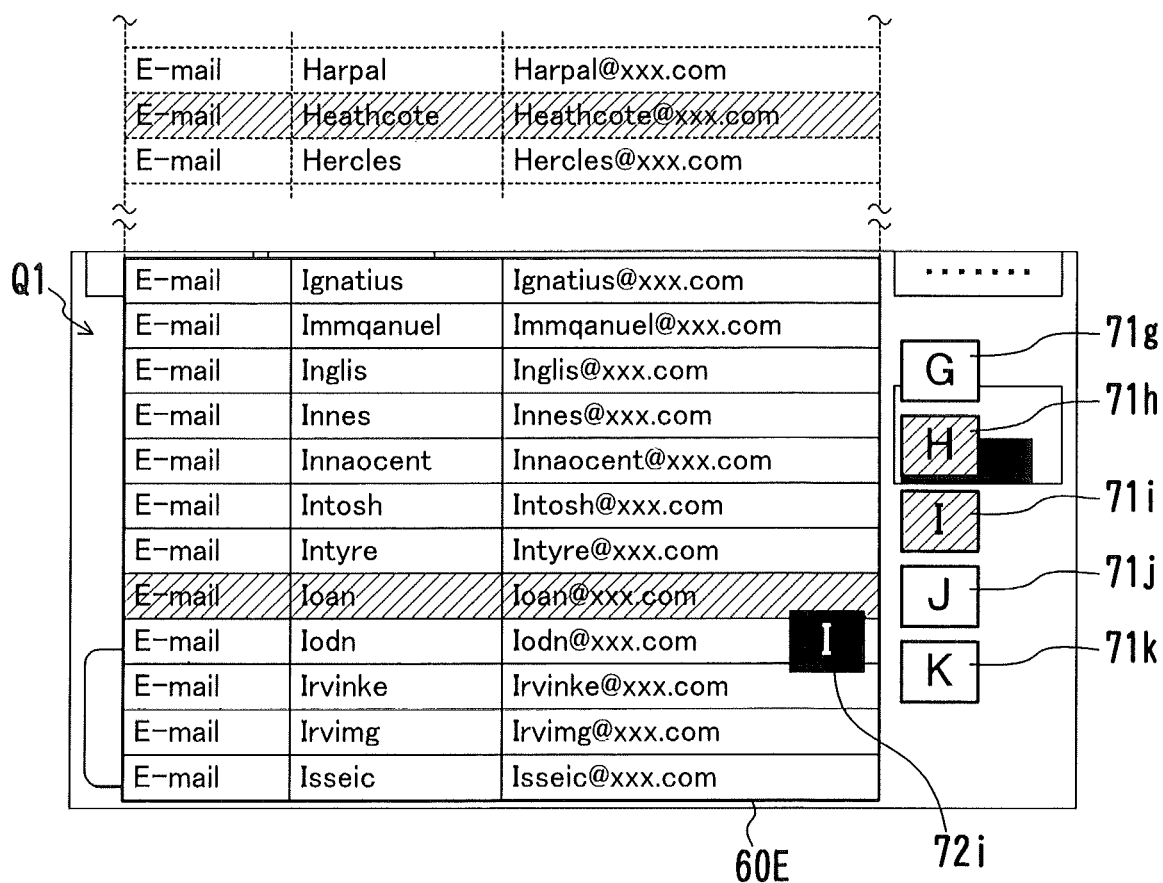
FIG. 12 is a diagram showing a first example of a way of emphasizing icons.
Figure 13:
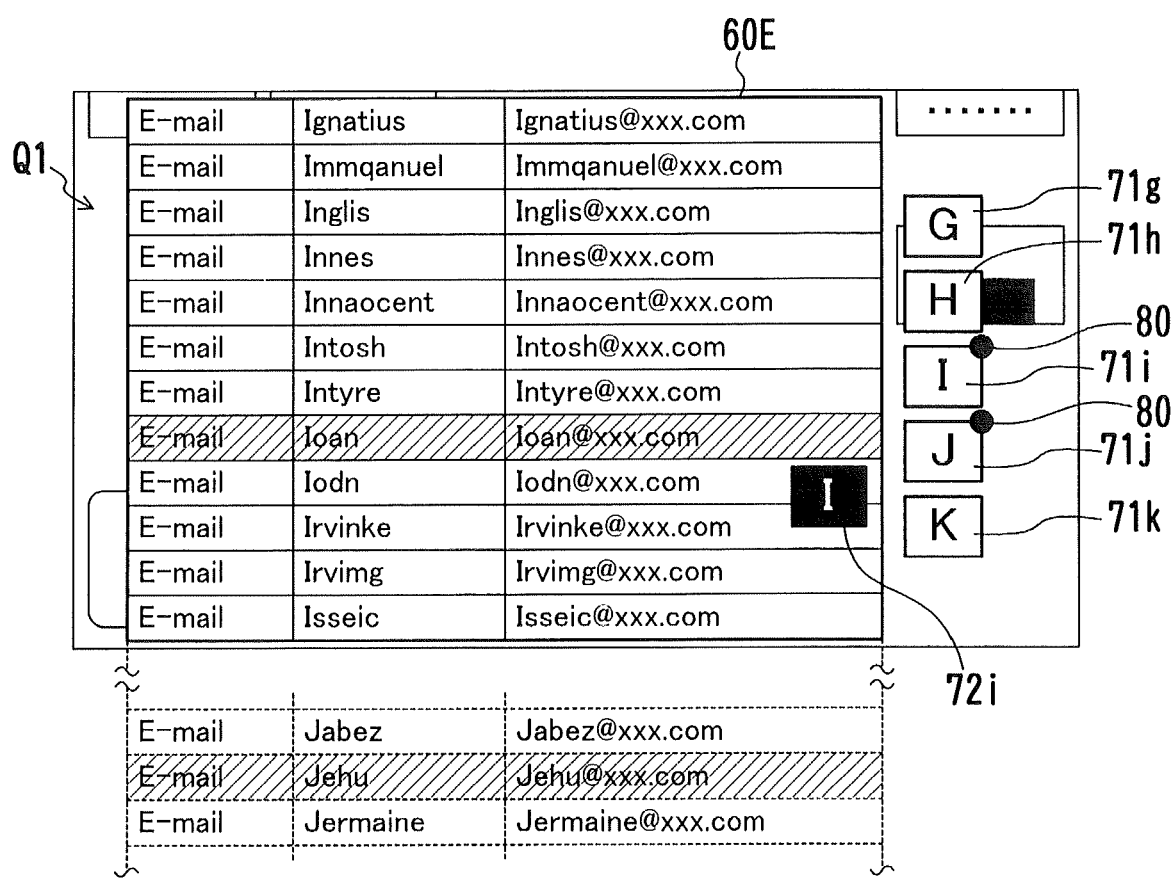
FIG. 13 is a diagram showing a second example of a way of emphasizing icons.

FIGS. 12 and 13 show a first example and a second example respectively as to how an icon representing an index corresponding to a selected line is emphasized in the icon arrangement.

Referring to FIG. 12, a plurality of sets of destination data having the initial letter of "I" in addressees are filled in lines of the address list currently displayed in the scrolled display region 60E. In the illustrated example, among the lines of the address list, a hatched line is selected. Although not displayed in the scrolled display region 60E, a line where destination data having the initial letter of "H" in an addressee is filled is also selected. Under such a selection state, among the five icons 71*g*, 71*h*, 71*i*, 71*j*, and 71*k* arranged to form a line, the icons 71*h* and 71*i* representing the indices "H" and "I" respectively corresponding to the selected lines are highlighted to change the background color of the icons 71*h* and 71*i*. As a result, the icons 71*h* and 71*i* are distinguished from the other icons 71*g*, 71*j*, and 71*k*.

Referring to FIG. 13, a plurality of sets of destination data having the initial letter of "I" in addressees are displayed as with the case of FIG. 12, and one of the lines where the destination data is filled is selected. Although not displayed in the scrolled display region 60E, a line where destination data having the initial letter "J" in an addressee is filled is also selected. Under such a selection state, among the five icons 71*g*, 71*h*, 71*i*, 71*j*, and 71*k* arranged to form a line, the icons 71*i* and 71*j* representing the indices "I" and "J" respectively corresponding to the selected lines are emphasized to be given a mark 80 meaning that the corresponding line is selected. As a result, the icons 71*i* and 71*j* are distinguished from the other icons 71*g*, 71*h*, and 71*k*.

Figure 14:
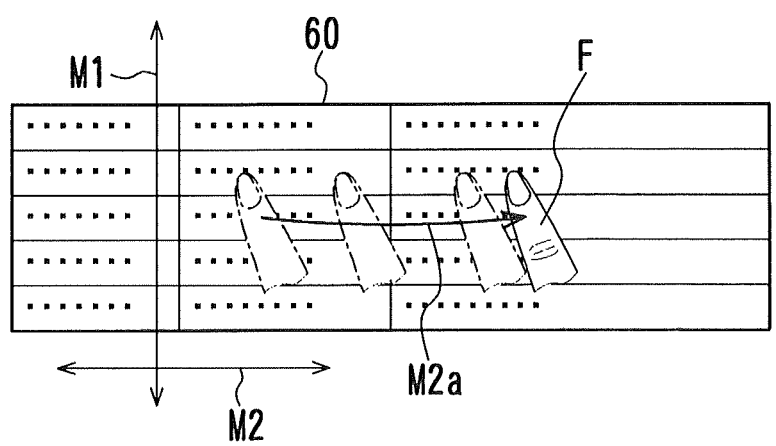
FIG. 14 is a diagram showing another touch operation on a scrolled display region.

FIG. 14 shows another touch operation on a scrolled display region. The operation shown in FIG. 14 is called horizontal operation in which a finger F touches any position in the scrolled display region 60 and the finger F moves in the direction of the arrow M2*a* which is orthogonal to the scroll direction M1. The horizontal operation may be a flick gesture or a drag gesture as long as the touched position falls within the scrolled display region 60.

Figure 15:
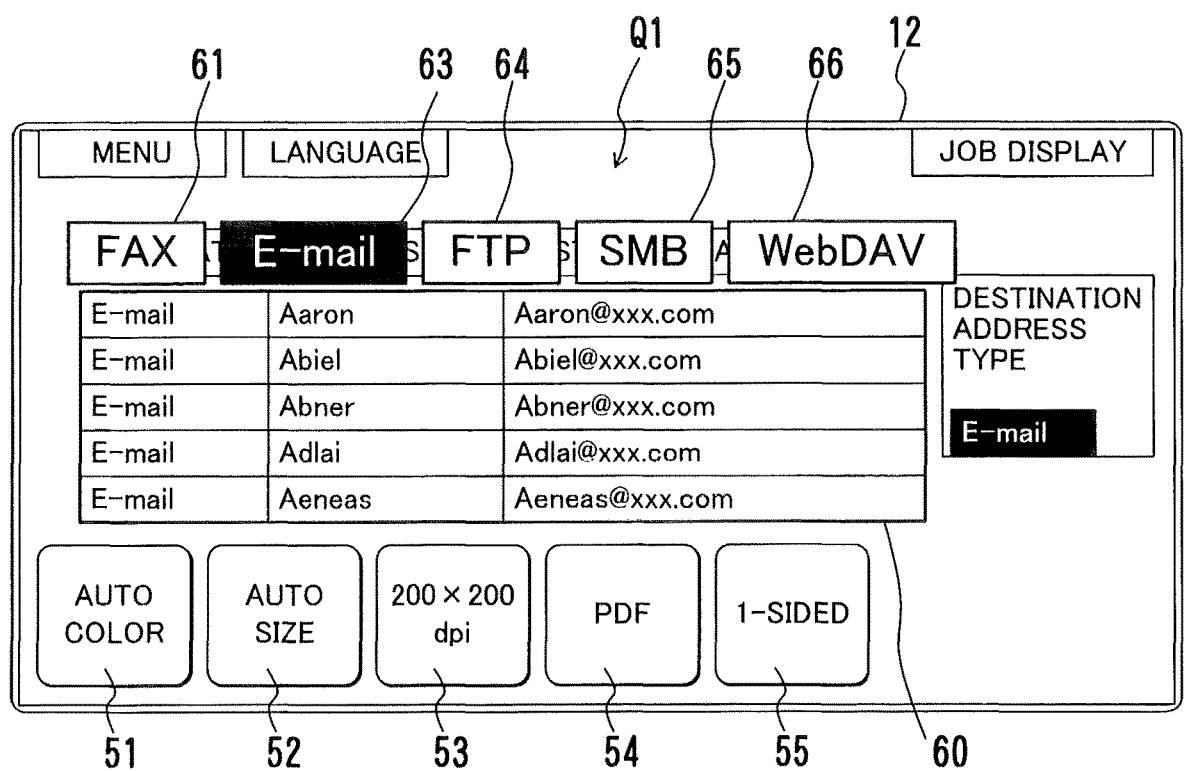
FIG. 15 is a diagram showing an example as to how icons are displayed in response to the touch operation shown in FIG. 14.

FIG. 15 shows an example as to how icons are displayed in response to the touch operation shown in FIG. 14. When the user performs the horizontal operation to move his/her finger onto the scrolled display region 60 in the screen with the operating screen Q1 displayed, the icons 61, 63, 64, 65, and 66 pop up in the vicinity of the scrolled display region 60. The icons 61, 63, 64, 65, and 66 correspond to five, which is the limited number m, types of communication (FAX, E-mail, FTP, SMB, and WebDAV) of the foregoing eight types of communication. Out of the five icons 61, 63, 64, 65, and 66, the icon 63 which corresponds to a communication type of the destination data currently displayed (E-mail in the illustrated example) is displayed in reverse video, so that the icon 63 is distinguished from the other icons 61, 64, 65, and 66. The icons 61, 63, 64, 65, and 66 arranged horizontally function as indicators showing the position of a communication type currently displayed in the entire arrangement of the eight communication types arranged in a predetermined order as discussed above. In addition, the icons 61, 63, 64, 65, and 66 are selection buttons to switch between communication types of data to be displayed. When the user taps any one of the icons 61, 63, 64, 65, and 66, destination data on communication type corresponding to the tapped icon is displayed. Thereafter, when the user performs scrolling, destination data on communication types other than those corresponding to the icons 61, 63, 64, 65, and 66 can be displayed.

Hereinafter, the operation of the image forming apparatus 1 performing the foregoing support display is described with reference to flowcharts and the drawings discussed above.

Figure 16:
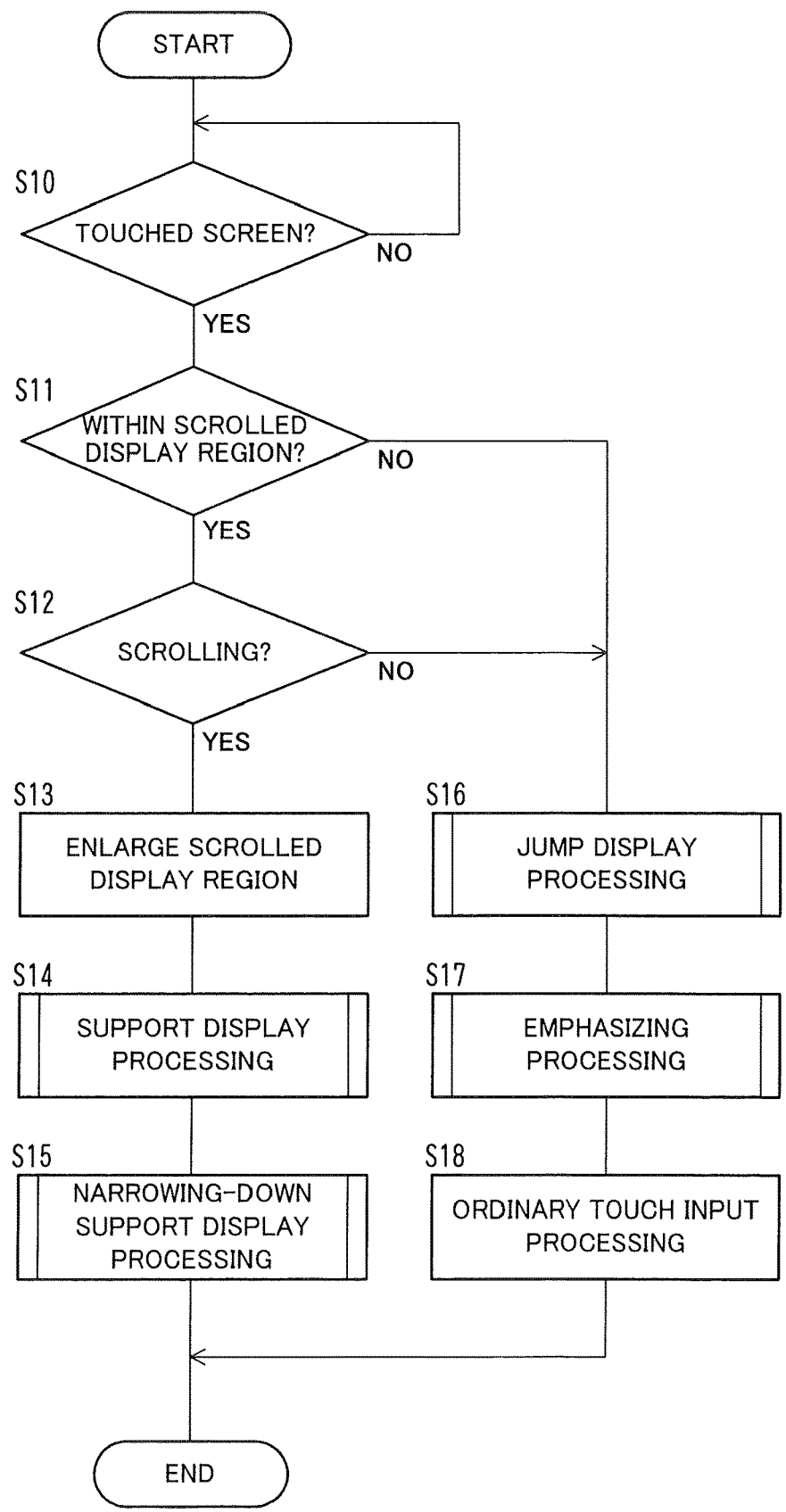
FIG. 16 is a flowchart depicting an example of the outline of operation related to scrolling in an image forming apparatus.

FIG. 16 is a flowchart depicting an example of the outline of operation related to scrolling in the image forming apparatus 1.

The operation input processing portion 101 (see FIG. 6) for receiving touch operation checks whether or not the touched position falls within the scrolled display region (Steps S10 and S11). If the touched position falls within the scrolled display region (YES in Step S11), then the operation input processing portion 101 checks whether or not the touch operation is scrolling (Step S12).

If the touch operation is scrolling (YES in Step S12), then the screen displaying portion 102 enlarges the scrolled display region 60 (Step S13), and the support display control portion 104 performs support display processing (Step S14) and narrowing-down support display processing (Step S15).

On the other hand, if the touched position does not fall within the scrolled display region (NO in Step S11), or, alternatively, if the touched position falls within the scrolled display region (YES in Step S11) and if the touch operation is not scrolling (NO in Step S12), then the scroll control portion 103 performs jump display processing (Step S16), and the support display control portion 104 performs emphasizing processing (Step S17). In Step S18, as ordinary touch input processing, the operation input processing portion 101 and the screen displaying portion 102 cooperate with each other to switch between displays made on the screen depending on other operation.

Figure 17:
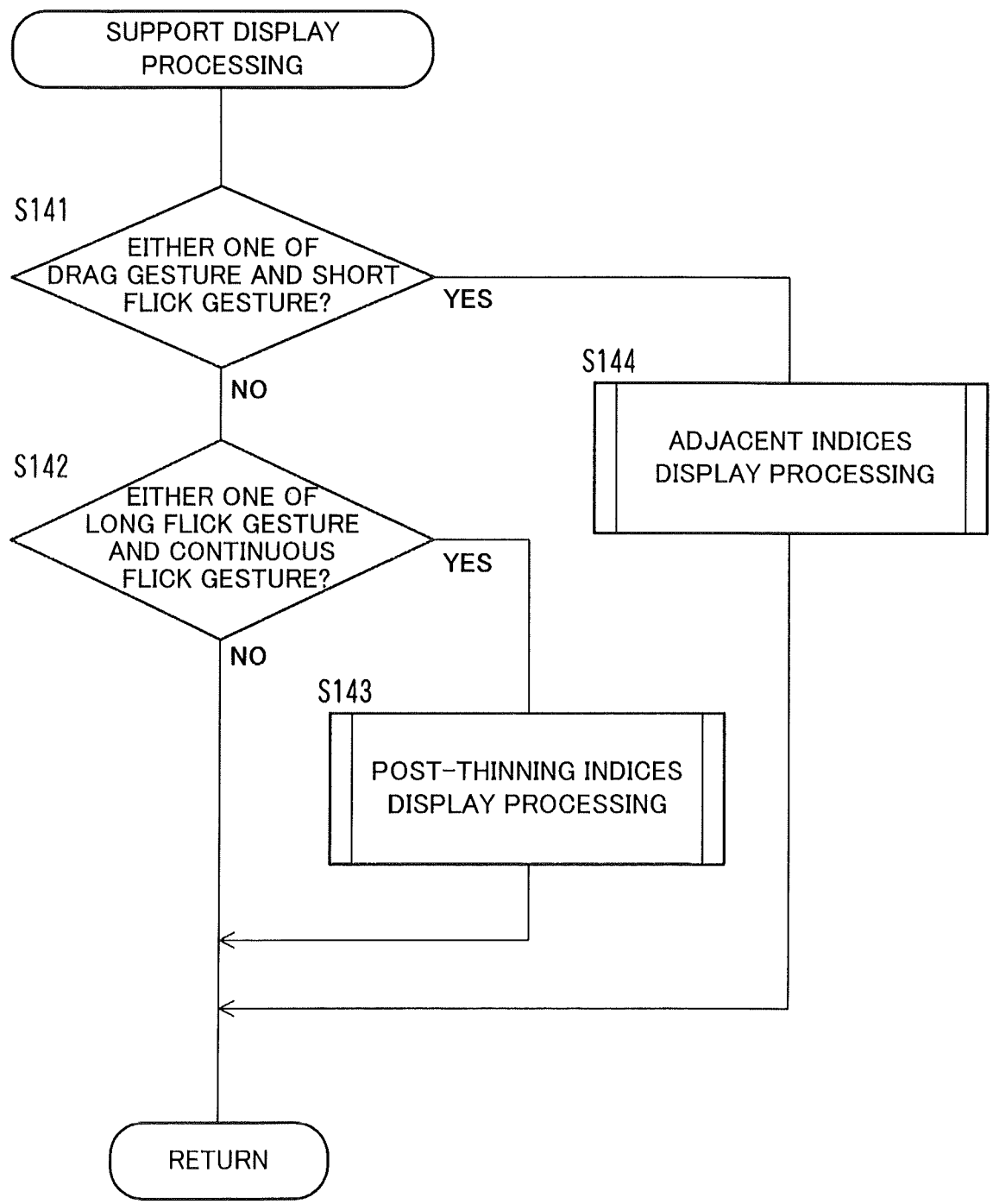
FIG. 17 is a flowchart depicting an example of support display processing shown in FIG. 16.

FIG. 17 is a flowchart depicting an example of support display processing shown in Step S14 of FIG. 16. The support display control portion 104 displays icons in the post-thinning indices display format or the adjacent indices display format in accordance with the touch operation analyzed by the operation input processing portion 101. To be specific, when the touch operation is relatively high-speed operation such as a drag gesture or a short flick gesture along the scroll direction (YES in Step S141), the support display control portion 104 performs adjacent indices display processing (Step S144). The short flick gesture herein is a flick gesture in which the finger travel distance by the touch operation is short and the time of touch by the finger is also short. In contrast, when the touch operation is relatively low-speed operation such as a long flick gesture along the scroll direction, or, a continuous flick gesture (repetition of a flick gesture) along the scroll direction (YES in Step S142), the support display control portion 104 performs post-thinning indices display processing (Step S143). If the touch operation is neither a drag gesture nor a flick gesture along the scroll direction (NO in Step S142), for example, if the touch operation is the horizontal operation described above, then the process goes back to the steps depicted in FIG. 16.

Figure 18:
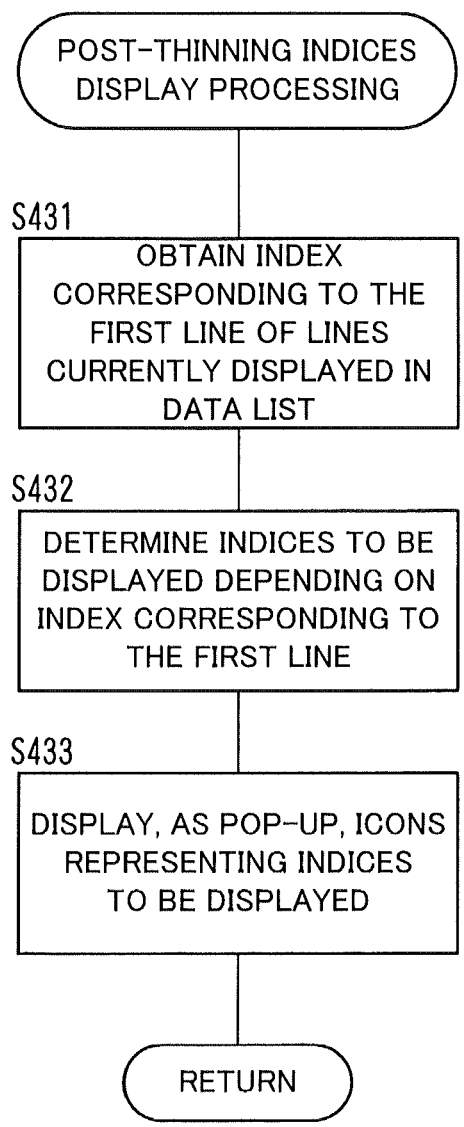
FIG. 18 is a flowchart depicting an example of post-thinning indices display processing shown in FIG. 17.

FIG. 18 is a flowchart depicting an example of post-thinning indices display processing shown in Step S143 of FIG. 17. The support display control portion 104 first refers to the pointer 105 and the index correspondence table Tc to obtain an index corresponding to the first line of lines currently displayed in the data list (Step S431). The support display control portion 104 then determines indices to be displayed depending on the obtained index corresponding to the first line (Step S432). Before the determination, the support display control portion 104 refers to the display pattern table Tp. The indices to be displayed are a display pattern (set of indices) associated with the index corresponding to the first line in the index correspondence table Tc. The support display control portion 104 then displays, as pop-up, the icons 71 and 72 representing the indices to be displayed (Step S433).

The processing for determining indices to be displayed in Step S432 may be modified as follows. Instead of the look-up table processing in which the display pattern table Tp is referred to, operation based on ordinal ranks of the index arrangement is performed to determine indices to be displayed. For example, if the index corresponding to the first line obtained in Step S431 (the index is denoted by a required index "*") is neither the index "A" arranged in the top line of the index arrangement nor the index "Z" arranged in the bottom line thereof, then operation is performed to determine the intermediate index arranged between the index "A" and the index "*", and the intermediate index arranged between the index "*" and the index "Z". It is assumed that an ordinal rank of the index "A" is set at 1, an ordinal rank of the index "Z" is set at 26, and an ordinal rank of the index "*" is set at α (1<α<26). In such a case, an ordinal rank of the intermediate index is a value closest to (α−1)/2 and a value closest to (26−α)/2. The intermediate indices determined based on the operation are displayed together with the indices "A", "*", and "Z". Suppose that, for example, the required index "*" is any one of the indices "B" and "Y", and the number of intermediate indices is one. In such a case, four indices of the intermediate index and the indices "A", "*", and "Z" are displayed. Suppose that, for example, the required index "*" is any one of the indices "A" and "Z". In such a case, three indices of the indices "A" and "Z", and the intermediate index therebetween are displayed.

Unlike the method in which a look-up table is referred to for the determination, according to the method in which indices to be displayed are determined through operation, indices to be displayed depending on a required index are not fixed. Suppose, among the indices "A" through "Z", an index has no records of destination data. In such a case, the index having no records of destination data is not displayed and indices having registered records thereof are given a higher priority for display. In short, the determination method through operation enables support display'depending on data registration state.

Figure 19:
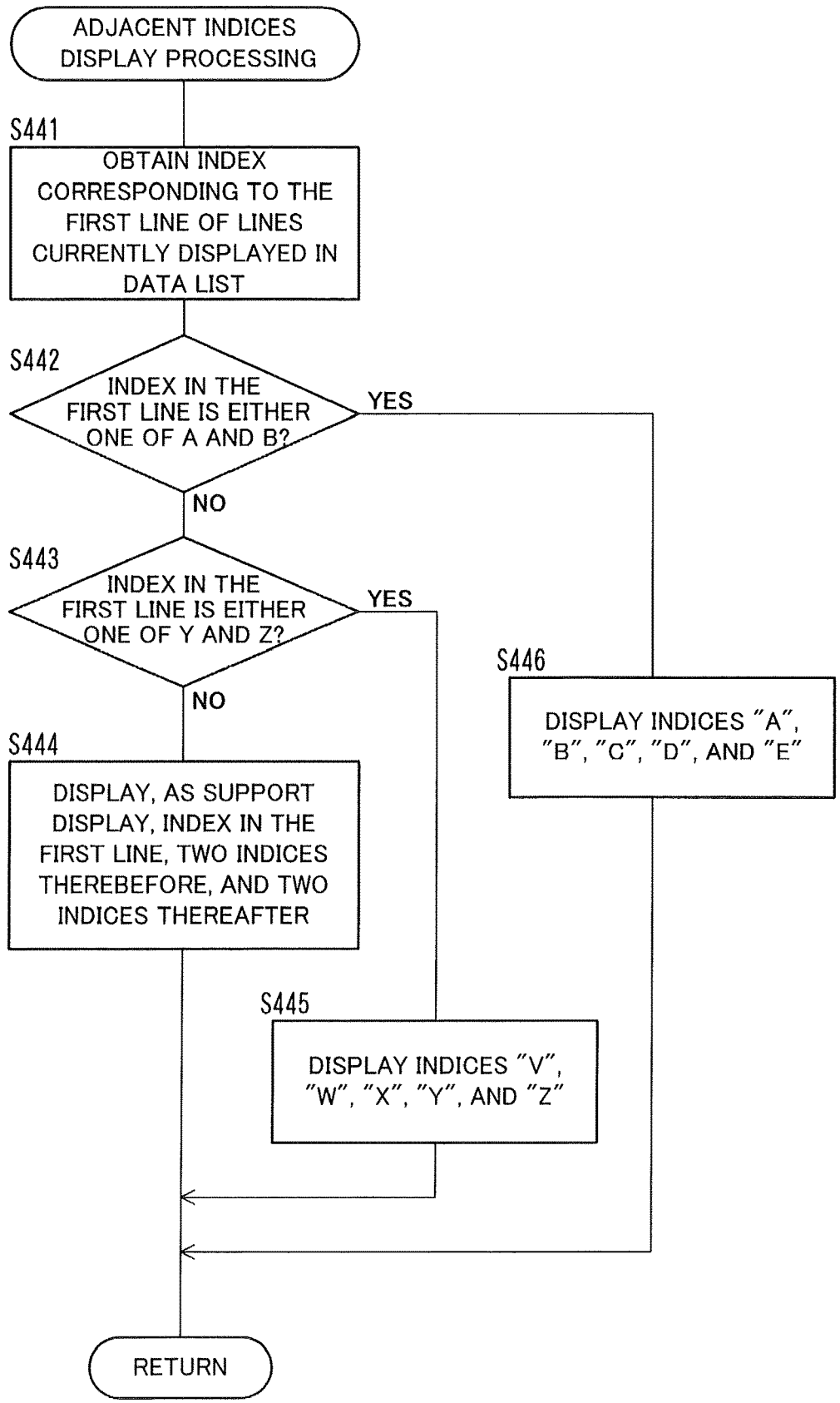
FIG. 19 is a flowchart depicting an example of adjacent indices display processing shown in FIG. 17.

FIG. 19 is a flowchart depicting an example of adjacent indices display processing shown in Step S144 of FIG. 17. The support display control portion 104 obtains a required index corresponding to the first line of lines currently displayed in the data list (Step S441). If the required index is the index "A" arranged in the top line of the index arrangement, or, the index "B" arranged in the next to the top line thereof (YES in Step S442), then the support display control portion 104 displays, as pop-up, the indices "A", "B", "C", "D", and "D" respectively corresponding to the top through the fifth ranked in the index arrangement (Step S446). If the required index is the index "Z" arranged in the bottom line of the index arrangement, or, the index "Y" arranged in the second line from the bottom thereof (YES in Step 443), then the support display control portion 104 displays, as pop-up, the indices "V", "W", "X", "Y", and "Z" whose ordinal ranks are consecutive from the bottom of the index arrangement (Step S445). If the required index is none of the indices "A", "B", "Y", and "Z", then the support display control portion 104 displays, as pop-up, the five indices whose ordinal ranks are consecutive, i.e., the required index and two indices therebefore and two indices thereafter (Step S444).

Figure 20:
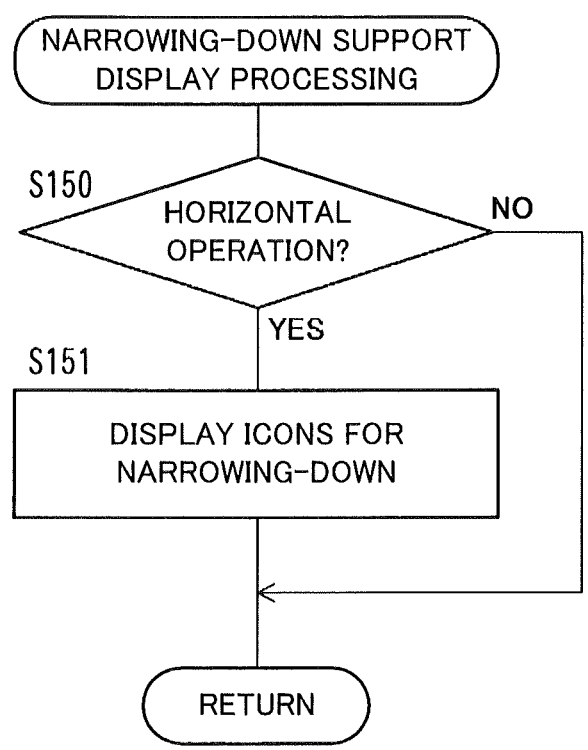
FIG. 20 is a flowchart depicting an example of narrowing-down support display processing shown in FIG. 16.

FIG. 20 is a flowchart depicting an example of narrowing-down support display processing shown in Step S15 of FIG.

16. When the touch operation received by the operation input processing portion 101 is the horizontal operation (YES in Step S150), the support display control portion 104 displays, as pop-up, icons for narrowing-down also serving as display switch buttons, e.g., the icons 61, and 63-66 of FIG. 15 (Step S151).

Figure 21:
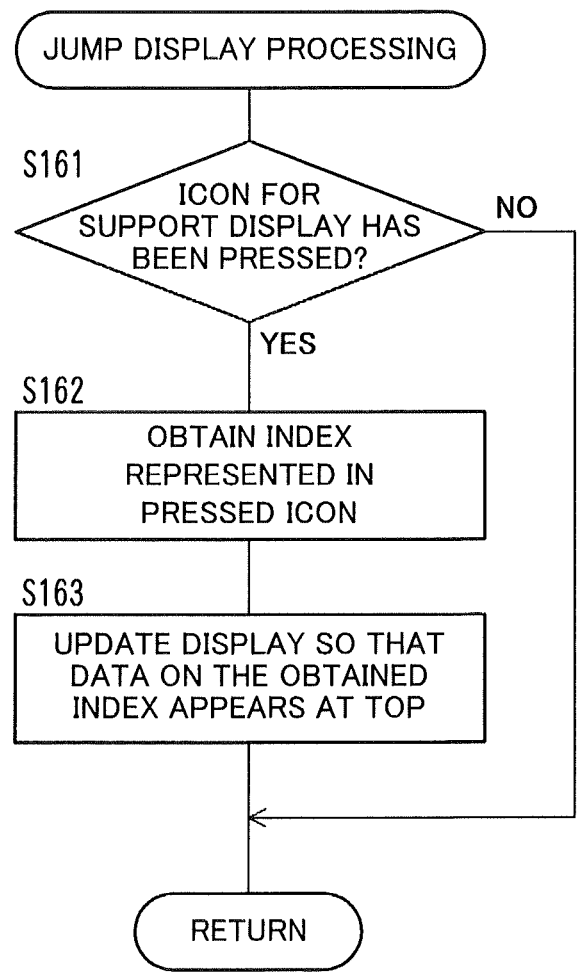
FIG. 21 is a flowchart depicting an example of jump display processing shown in FIG. 16.

FIG. 21 is a flowchart depicting an example of jump display processing shown in Step S16 of FIG. 16. When a user presses any one of the icons 71 for support display arranged to form a line (YES in Step S161), the scroll control portion 103 obtains an index represented in the pressed icon (Step S162). The scroll control portion 103 then changes the pointer 105 in such a manner that data corresponding to the index represented in the pressed icon appears in the first line of the list currently displayed, and also, the screen displaying portion 102 updates the display as shown in FIG. 11 in accordance with the pointer 105 (Step S163).

Figure 22:
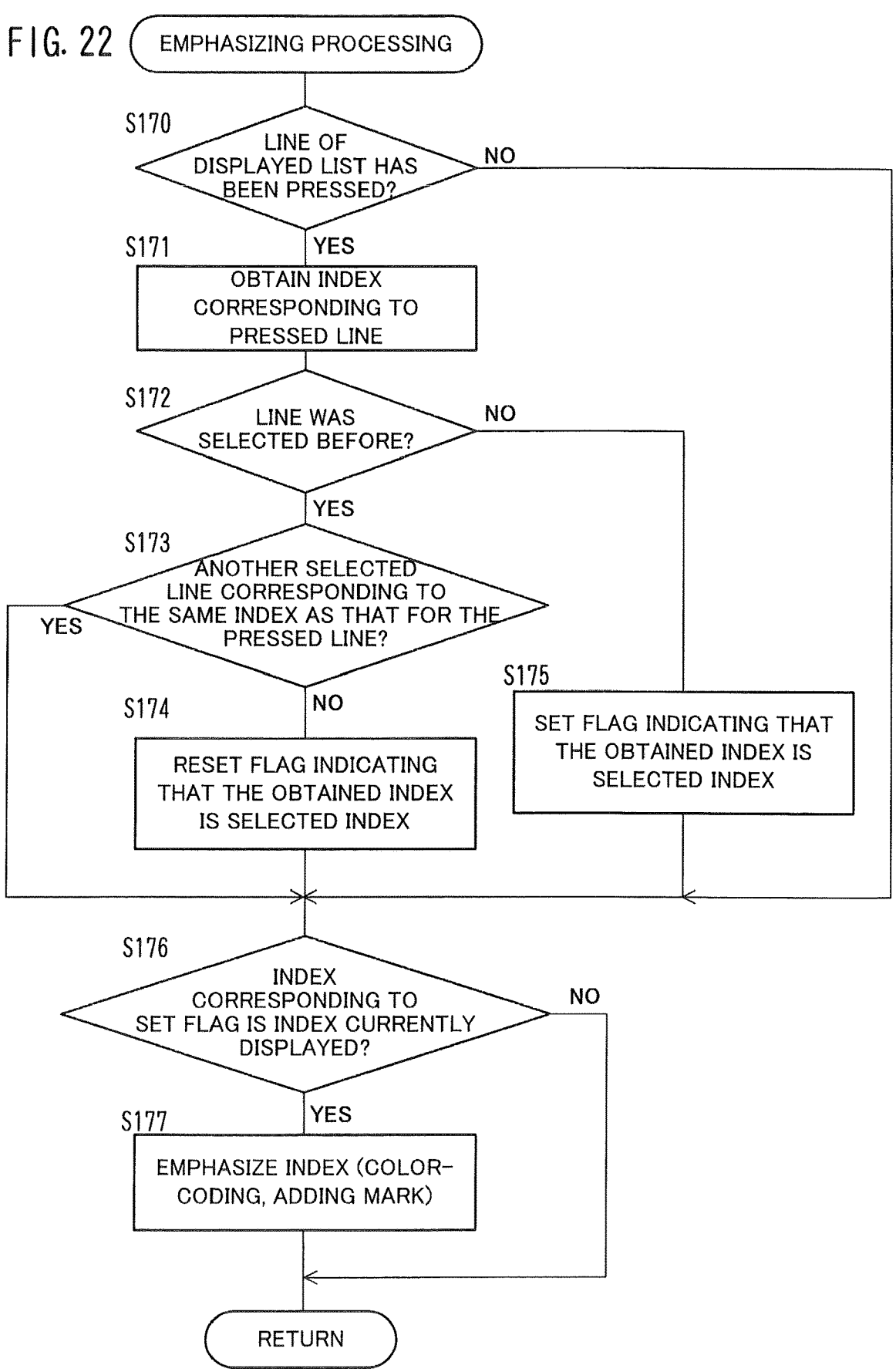
FIG. 22 is a flowchart depicting an example of emphasizing processing shown in FIG. 16.

FIG. 22 is a flowchart depicting an example of emphasizing processing shown in Step S17 of FIG. 16. When a user touches (presses) any one of lines of an address list displayed (Step S170), the screen displaying portion 102 obtains an index corresponding to destination data in the pressed line (Step S171). The screen displaying portion 102 then checks whether or not the pressed line is a selected line that has been selected before (Step S172). If the pressed line is not the selected line (NO in Step S172), then pressing the line this time means selecting the line (strictly speaking, selecting destination data in the line). Thus, the screen displaying portion 102 sets, in the flag register 106, a flag indicating that the obtained index is a selected index (Step S175). If the pressed line is the selected line that has been selected before (YES in Step S172), then pressing the line this time means canceling the preceding line selection. In such a case, the screen displaying portion 102 checks whether or not there is another selected line corresponding to the same index as that for the pressed line (Step S173). If the result of the check is positive (YES in Step S173), then the process goes to Step S176. Otherwise (NO in Step S173), the screen displaying portion 102 resets a flag indicating that the obtained index is a selected index (Step S174) because no more selected line for the index is present after canceling the selection by pressing the line this time.

In Step S176, the support display control portion 104 checks whether or not the selected index shown in the flag register 106 is the index currently displayed and represented in the icon 71. If any one of the indices currently displayed is the selected index (YES in Step S176), then the support display control portion 104 emphasizes the selected index currently displayed by using color-coding shown in FIG. 12 or giving the mark 80 shown in FIG. 13 to the selected index (Step S177).

Up to this point, the support display for address list display is described. For document list display, support display similar to the one described above can be performed. FIG. 23 shows an example of the structure of data in the document database 260 in which data related to a data document list is managed.

Referring to FIG. 23, the document database 260 has registered therein data on document names of documents stored in any of boxes in the storage 39. In the document database 260, the document names are classified into M groups depending on where the document is stored, and also classified into N groups depending on when the document is stored.

The document storage locations are 31 boxes of "shared box", "personal box 1", "personal box 2", . . . , "personal box 29", and "personal box 30". The 31 boxes correspond to 31 groups including the groups 601, 602, 603, 630, and 631. In short, the number M of groups formed by the classification based on document storage locations is "31" in this example.

Document names classified into the group 601 also belong to any of 36 groups including groups 701, 712, 713, and 736. The groups 701-736 are provided on a month-by-month basis. To be specific, the groups 701-736 correspond to indices for the period of three years during which the documents are stored. The indices range from "2011, 12", which is the newest moth, to "2009, 01", which is the oldest month. For example, the group 701 corresponds to document names of documents stored in December 2011. The group 736 corresponds to document names of documents stored in January 2009.

As with the group 601, document names classified into the other groups based on document storage locations belong to any of 36 groups associated with indices. The number N of groups formed by the foregoing classification based on document storage data/time is "36" in this example.

According to the support display for a document list, depending on scrolling, out of the 36 indices ranging from "2011, 12" to "2009, 01", a plurality of icons pop up which represent three to five indices or so smaller than the number N.

The foregoing embodiment may be modified as follows. To be specific, the support display format may be limited to the post-thinning indices display format or the adjacent indices display format. When the support display format is limited to the post-thinning indices display format, it is preferable that, in Step S14 of FIG. 16, the steps in the flowchart of FIG. 18 are performed instead of the steps in the flowchart of FIG. 17. When the support display format is limited to the adjacent indices display format, it is preferable that, in Step S14 of FIG. 16, the steps in the flowchart of FIG. 19 are performed instead of the steps in the flowchart of FIG. 17.

It is not always necessary to enlarge the scrolled display region 60. When the scrolled display region 60 is large enough from the beginning, or, when enlarging the scrolled display region 60 hides a button to be displayed, the processing in Step S13 of FIG. 16 for enlarging the scrolled display region 60 may be omitted. In the illustrated example of FIG. 24, the icons 71a, 71e, 71i, 71n, 71z, and 72a pop up without enlarging the scrolled display region 60.

Scrolled images are not limited to an address list and a document list. Any scrolled images may be used as long as they show many sets of data classified into any of many groups. A data list such as a job history list may be used as the scrolled images. The exemplified address list is data list in which destination data for communication types are sequentially listed. Instead of this, however, an address list may be provided for each of the communication types. Grouping based on addressee is not limited to grouping in alphabetical order. Other grouping methods may be used depending on countries and regions where the image forming apparatus 1 is used.

In the foregoing embodiment, not all data classified into groups are displayed, and instead, an icon corresponding to a group selected from among the groups is displayed. This enables, on a screen limited in size, a user to know to which positional part of the scrolled data list a part of the data list displayed corresponds, and to provide a higher degree of flexibility in scrolling.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An information device provided with a touch-sensitive panel, the information device comprising:
a touch-sensitive panel configured to display an operating screen;
a data storage configured to store therein a plurality of data, each of the data being classified into a plurality of groups arranged in accordance with a predetermined order; and
a hardware processor configured to:
display a part of a data list in which the plurality of data classified into any one of the plurality of groups are listed on the operating screen;
scroll the data list in accordance with a touch operation of a user on the operating screen, the touch operation being to touch a position on the operating screen and to move the touched position in an arrangement direction of an arrangement of the plurality of data; and
display simultaneously, in response to the scrolling of the data list, as a pop-up, a plurality of icons functioning as indicators, each of the plurality of icons corresponding to a respective group, among the plurality of groups, and one of the displayed icons corresponds to the group being displayed as the part of the data list on the operating screen, the plurality of icons being displayed in a manner to appear in the predetermined order of the arrangement direction and more than one of the plurality of icons being changed simultaneously by changing of the group of the part of the data list displayed on the operating screen in response to the touch operation for the scrolling.

2. A nontransitory computer readable medium encoded with a program for an information device comprising a touch-sensitive panel configured to display an operating screen, and a data storage configured to store therein a plurality of data, each of the data being classified into a plurality of groups arranged in accordance with a predetermined order; the program comprising:
displaying a part, of a data list in which the plurality of data classified into any one of the plurality of groups are listed on the operating screen;
scrolling the data list in accordance with a touch operation of a user on the operating screen, the touch operation being to touch a position on the operating screen and to move the touched position in an arrangement direction of an arrangement of the plurality of data; and
displaying simultaneously, in response to the scrolling of the data list, as a pop-up, a plurality of icons functioning as indicators, each of the plurality of icons corresponding to a respective group, among the plurality of groups, and one of the displayed icons corresponds to the group being displayed as the part of the data list on the operating screen, the plurality of icons being displayed in a manner to appear in the predetermined order of the arrangement direction and more than one of the plurality of icons being changed simultaneously by changing of the group of the part of the data list displayed on the operating screen in response to the touch operation for the scrolling.

3. The information device according to claim 1, wherein the plurality of data stored in the data storage portion are data classified into at least three groups,
the processor displays, as the data list, at least a part of a list in which the plurality of data are listed on a group-by-group basis, and
the touch operation for causing the processor to scroll through the data list displayed is an operation to move the position touched in a direction along which the plurality of data are listed.

4. The information device according to claim 3, wherein said one icon has a design different from designs of the remaining icons.

5. The information device according to claim 3, wherein the icons displayed as a pop up in the manner include an icon that corresponds to a top group of the plurality of groups and an icon that corresponds to a bottom group of the plurality of groups, the top group being arranged at a top of the data list, and the bottom group being arranged at a bottom of the data list.

6. The information device according to claim 3, wherein the processor sets the plurality of groups in accordance with a control table, the control table defining which group of icons to be displayed as a pop-up for a case where each of the plurality of groups corresponds to the currently-displayed group.

7. The information device according to claim 5, wherein the processor sets, as the plurality of groups, the top group, a group arranged between the top group and the currently-displayed group in arrangement order in the data list, the currently-displayed group, a group arranged between the currently-displayed group and the bottom group in the arrangement order in the data list, and the bottom group.

8. The information device according to claim 3, wherein the processor sets, as the plurality of groups, the currently-displayed group, and one or more groups whose arrangement orders in the data list are continuous with an order of the currently-displayed group.

9. The information device according to claim 8, wherein the processor sets, as the plurality of groups, the currently-displayed group, a group whose arrangement order in the data list is higher than that of the currently-displayed group, and a group whose arrangement order in the data list is lower than that of the currently-displayed group.

10. The information device according to claim 3, wherein the groups displayed as a pop-up are a part of the plurality of groups; and the processor is further configured to determine whether the touch operation corresponds to high-speed operation in which a rate of change at the position touched is greater than a threshold or corresponds to low-speed operation in which the rate of change is smaller than the threshold; wherein
if the touch operation is determined to correspond to the low-speed operation, then the processor sets, as the part of the plurality of groups, a top group having a top ordinal rank in the data list, a bottom group having a bottom ordinal rank in the data list, and a group having an ordinal rank between the top ordinal rank and the bottom ordinal rank, and
if the touch operation is determined to correspond to the high-speed operation, then the processor sets, as the part of the plurality of groups, at least the currently-displayed group, and at least one group having an ordinal rank consecutive from the ordinal rank of the currently-displayed group.

11. The information device according to claim 3, wherein the plurality of data classified into the plurality of groups are also classified into "M" sets (M≥3), the "M" sets being different from the plurality of groups, and the processor displays, in accordance with a second-direction touch operation, as a pop-up, second icons on the operating screen, the second icons corresponding to sets that are a part of the "M" sets and include a set corresponding to a part displayed in the data list, the second-direction touch operation being to touch a position in the scrolled display region in the touch input screen and to move the position touched in a second direction orthogonal to the direction along which the plurality of data are listed.

12. The information device according to claim 1, wherein every time one of the groups changes in response to the data list scrolled on the operating screen, the plurality of icons are switched and displayed as a pop-up.

13. The information device according to claim 1, wherein the plurality of data are classified into at least three groups, and
wherein the part of the data list is displayed on a predetermined display region of the operating screen, and in response to the touch operation on the predetermined display region, the plurality of icons are displayed on the operation screen as pop-up.

14. The information device according to claim 1, wherein the plurality of data is classified into at least five groups.

15. The information device according to claim 1, wherein a type of the index in the pop-up is switched in accordance to a speed of the scroll between a first type that the icons for the plurality of group are arranged in a consecutive form in the pop-up and a second type that the icons for the plurality of group are arranged in a post-thinning form in the pop-up.

16. The information device according to claim 1, wherein every time one of the groups changes in response to the data list scrolled on the operating screen, the plurality of icons are switched and displayed as a pop-up.

17. The nontransitory computer readable medium according to claim 2, wherein
the plurality of data stored in the data storage portion are data classified into at least three groups,
the program comprises displaying, as the data list, at least a part of a list in which the plurality of data are listed on a group-by-group basis, and
the touch operation for causing the program to scroll through the data list displayed is an operation to move the position touched in a direction along which the plurality of data are listed.

18. The nontransitory computer readable medium according to claim 17, wherein said one icon has a design different from designs of the remaining icons.

19. The nontransitory computer readable medium according to claim 17, wherein the icons displayed as a pop up in the manner include an icon that corresponds to a top group of the plurality of groups and an icon that corresponds to a bottom group of the plurality of groups, the top group being arranged at a top of the data list, and the bottom group being arranged at a bottom of the data list.

20. The nontransitory computer readable medium according to claim 17, wherein the program includes setting the plurality of groups in accordance with a control table, the control table defining which group of icons to be displayed as a pop-up for a case where each of the plurality of groups corresponds to the currently-displayed group.

21. The nontransitory computer readable medium according to claim 19, wherein the program includes setting, as the plurality of groups, the top group, a group arranged between the top group and the currently-displayed group in arrangement order in the data list, the currently-displayed group, a group arranged between the currently-displayed group and the bottom group in the arrangement order in the data list, and the bottom group.

22. The nontransitory computer readable medium according to claim 17, wherein the program includes setting, as the plurality of groups, the currently-displayed group, and one or more groups whose arrangement orders in the data list are continuous with an order of the currently-displayed group.

23. The nontransitory computer readable medium according to claim 22, wherein the program includes setting, as the plurality of groups, the currently-displayed group, a group whose arrangement order in the data list is higher than that of the currently-displayed group, and a group whose arrangement order in the data list is lower than that of the currently-displayed group.

24. The nontransitory computer readable medium according to claim 17, wherein the groups displayed as a pop-up are a part of the plurality of groups; and the program further includes determining whether the touch operation corresponds to high-speed operation in which a rate of change at the position touched is greater than a threshold or corresponds to low-speed operation in which the rate of change is smaller than the threshold; wherein
if the touch operation is determined to correspond to the low-speed operation, then the program sets, as the part of the plurality of groups, a top group having a top ordinal rank in the data list, a bottom group having a bottom ordinal rank in the data list, and a group having an ordinal rank between the top ordinal rank and the bottom ordinal rank, and
if the touch operation is determined to correspond to the high-speed operation, then the program sets, as the part of the plurality of groups, at least the currently-displayed group, and at least one group having an ordinal rank consecutive from the ordinal rank of the currently-displayed group.

25. The nontransitory computer readable medium according to claim 17, wherein
the plurality of data classified into the plurality of groups are also classified into "M" sets (M≥3), the "M" sets being different from the plurality of groups, and
the program includes displaying, in accordance with a second-direction touch operation, as a pop-up, second icons on the operating screen, the second icons corresponding to sets that are a part of the "M" sets and include a set corresponding to a part displayed in the data list, the second-direction touch operation being to touch a position in the scrolled display region in the touch input screen and to move the position touched in a second direction orthogonal to the direction along which the plurality of data are listed.

26. The nontransitory computer readable medium according to claim 2, wherein every time one of the groups changes in response to the data list scrolled on the operating screen, the plurality of icons are switched and displayed as a pop-up.

27. The nontransitory computer readable medium according to claim 2, wherein the plurality of data are classified into at least three groups, and
wherein the part of the data list is displayed on a predetermined display region of the operating screen, and in response to the touch operation on the predetermined display region, the plurality of icons are displayed on the operation screen as pop-up.

28. The nontransitory computer readable medium, according to claim 2, wherein the plurality of data is classified into at least five groups.

29. The nontransitory computer readable medium according to claim 2, wherein a type of the index in the pop-up is switched in accordance to a speed of the scroll between a first type that the icons for the plurality of group are arranged in a consecutive form in the pop-up and a second type that the icons for the plurality of group are arranged in a post-thinning form in the pop-up.

30. The nontransitory computer readable medium according to claim 2, wherein every time one of the groups changes in response to the data list scrolled on the operating screen, the plurality of icons are switched and displayed as a pop-up.

31. The information device according to claim 1, wherein the hardware processor is configured not to display, in response to a tap operation of touching a position on the operating screen and releasing while the data list is static on the operating screen, as the pop-up, the plurality of icons, and to select an icon corresponding to the touched position en the operating screen.

32. The information device according to claim 1, wherein at least three of the plurality of icons are changed by changing of the group of the part of the data list displayed on the operating screen in response to the touch operation for the scrolling.

33. The information device according to claim 1, wherein the more than one of the plurality of icons comprises: (i) a first icon of the group being displayed as the part of the data list on the operating screen, and (ii) one or more second icons other than the first icon.

34. The nontransitory computer readable medium according to claim 2, wherein the more than one of the plurality of icons comprises: (i) a first icon of the group being displayed as the part of the data list on the operating screen, and (ii) one or more second icons other than the first icon.

* * * * *